(12) United States Patent
Ionescu et al.

(10) Patent No.: US 8,281,039 B2
(45) Date of Patent: Oct. 2, 2012

(54) RECONFIGURABLE MULTIMEDIA COLLABORATION SYSTEM

(75) Inventors: Dan Ionescu, Ottawa (CA); Raymond Elliott Peterkin, Ottawa (CA); Fadi El-Hassan, Ottawa (CA); Mohamed Abou-Gabal, Ottawa (CA)

(73) Assignee: University of Ottawa, Ottawa, Ontario (CA)

( * ) Notice: Subject to any disclaimer, the term of this patent is extended or adjusted under 35 U.S.C. 154(b) by 525 days.

(21) Appl. No.: 12/554,221

(22) Filed: Sep. 4, 2009

(65) Prior Publication Data

US 2010/0057851 A1    Mar. 4, 2010

Related U.S. Application Data

(60) Provisional application No. 61/094,134, filed on Sep. 4, 2008.

(51) Int. Cl.
*G06F 15/16*    (2006.01)
(52) U.S. Cl. ........ 709/250; 709/201; 709/202; 709/223; 709/230; 709/237
(58) Field of Classification Search .................. 709/201, 709/202, 220, 230, 237, 250
See application file for complete search history.

(56) References Cited

U.S. PATENT DOCUMENTS

| | | | | |
|---|---|---|---|---|
| 2003/0018704 | A1* | 1/2003 | Polychronidis et al. | 709/202 |
| 2005/0147088 | A1* | 7/2005 | Bao et al. | 370/352 |
| 2007/0050507 | A1* | 3/2007 | Ollikainen et al. | 709/227 |
| 2008/0043770 | A1* | 2/2008 | Arnoff et al. | 370/429 |
| 2009/0245183 | A1* | 10/2009 | Baker et al. | 370/329 |

* cited by examiner

*Primary Examiner* — Liangche A Wang
(74) *Attorney, Agent, or Firm* — Harness, Dickey & Pierce, PLC

(57) ABSTRACT

A system for multimedia communications implemented with reconfigurable technology is disclosed. The system includes: a SIP engine implemented in hardware that executes functions defined by Session Initiation Protocol (SIP); a XML engine implemented in hardware that executes functions defined by Extensible Markup Language (XML); and an interface that coordinates functions executed by the SIP engine and the XML engine. A standard set of features are provided for robust communications while permitting the addition of more features to enhance the multimedia communications experience. For example, audio and video communication, instant messaging and presence can be provided by the system while P2P and IP Multimedia Systems (IMS) can be provided through expansion. Reconfigurable technology allows the system to achieve optimal performance in performing various tasks.

17 Claims, 51 Drawing Sheets

```
INVITE sip:werner.heisenberg@munich.de SIP/2.0
Via: SIP/2.0/UDP 100.101.102.103:5060;branch=z9hG4bKmp17a
Max-Forwards: 70
To: <sip:werner.heisenberg@munich.de>
From: <sip:schroed5244@aol.com>;tag=42
Call-ID: 10@100.101.102.103
CSeq: 1 INVITE
Contact: <sip:schroed5244@pc33.aol.com>
Content-Type: application/sdp
Content-Length: 159 v=0
o=schroed5244 2890844526 2890844526 IN IP4
100.101.102.103
s=Phone Call
t=0 0
c=IN IP4 100.101.102.103
m=audio 49170 RTP/AVP 0
a=rtpmap:0 PCMU/8000
```

Figure 20

```
SIP/2.0 200 OK
Via: SIP/2.0/UDP 100.101.102.103:5060;branch=z9hG4bKmp17a
To: <sip:werner.heisenberg@munich.de>;tag=314159
From: <sip:schroed5244@aol.com>;tag=42
Call-ID: 10@100.101.102.103
CSeq: 1 INVITE
Contact: <sip:werner.heisenberg@200.201.202.203>
Content-Type: application/sdp
Content-Length: 159 v=0
o=heisenberg 2890844526 2890844526 IN IP4 200.201.202.203
c=IN IP4 200.201.202.203
t=0 0
m=audio 49170 RTP/AVP 0
a=rtpmap:0 PCMU/8000
```

Figure 21

```
ACK sip:werner.heisenberg@200.201.202.203 SIP/2.0
Via: SIP/2.0/UDP 100.101.102.103:5060;branch=z9hG4bKka42
Max-Forwards: 70
To: <sip:werner.heisenberg@munich.de>;tag=314159
From: <sip:schroed5244@aol.com>;tag=42
Call-ID: 10@100.101.102.103
CSeq: 1 ACK
Content-Length: 0
```

Figure 22

```
BYE sip:schroed5244@pc33.aol.com SIP/2.0
Via: SIP/2.0/UDP 200.201.202.203:5060;branch=z9hG4bK4332
Max-Forwards: 70
To: <sip:schroed5244@aol.com>;tag=42
From: <sip:werner.heisenberg@munich.de>;tag=314159
Call-ID: 10@100.101.102.103
CSeq: 2000 BYE
Content-Length: 0
```

Figure 23

```
SUBSCRIBE sip:poisson@probability.org SIP/2.0
Via: SIP/2.0/TCP
lecturehall21.academy.ru:5060;branch=z9hG4bK348471123
Max-Forwards: 70
To: <sip:poisson@probability.org>
From: <sip:chebychev@academy.ru>;tag=21171
Call-ID: 58dkfj349241k34452k592520
CSeq: 3412 SUBSCRIBE
Allow-Events: presence
Allow: ACK, INVITE, CANCEL, BYE, NOTIFY, SUBSCRIBE,
MESSAGE
Contact: <sip:pafnuty@lecturehall21.academy.ru>
Event: presence
Content-Length: 0
```

Figure 24

```
NOTIFY sip:pafnuty@lecturehall21.academy.ru SIP/2.0
Via: SIP/2.0/TCP dist.probablilty.org:5060
     ;branch=z9hG4bK4321
Max-Forwards: 70
To: <sip:chebychev@academy.ru>;tag=21171
From: <sip:poisson@probability.org>;tag=25140
Call-ID: 58dkfj349241k34452k592520
CSeq: 1026 NOTIFY
Allow: ACK, INVITE, CANCEL, BYE, NOTIFY, SUBSCRIBE,
MESSAGE
Allow-Events: dialog
Contact: <sip:s.possion@dist.probability.org>
Subscription-State: active;expires=3600
Event: presence
Content-Type: application/cpim-pidf+xml
Content-Length: 244

<?xml version="1.0" encoding="UTF-8"?>
<presence xmlns="urn:ietf:params:xml:ns:cpim-pidf"
   entity="sip:poisson@probability.org">
 <tuple id="452426775">
 <status>
  <basic>closed</basic>
  </status>
 </tuple>
</presence>
```

Figure 25

```
MESSAGE sip:user2@domain.com SIP/2.0
Via: SIP/2.0/TCP
user1pc.domain.com;branch=z9hG4bK776sgdkse
Max-Forwards: 70
From: <sip:user1@domain.com>;tag=49583
To: <sip:user2@domain.com>
Call-ID: asd88asd77a@1.2.3.4
CSeq: 1 MESSAGE
Content-Type: text/plain
Content-Length: 18

Watson, come here.
```

Figure 26

Where *n* = Indicates *multiple* RMCS modules deployed

```
<?xml version="1.0" encoding="UTF-8"?>
<presence xmlns="urn:ietf:params:xml:ns:pidf"
  entity="pres:elhassan@site.uottawa.ca">
  <tuple id="du94h3">
    <status>
      <basic>open</basic>
    </status>
  </tuple>
</presence>
```

Figure 44

RECONFIGURABLE MULTIMEDIA COLLABORATION SYSTEM

CROSS-REFERENCE TO RELATED APPLICATIONS

This application claims the benefit of U.S. Provisional Application No. 61/094,134, filed on Sep. 4, 2008. The entire disclosure of the above application is incorporated herein by reference.

FIELD

The present disclosure relates to a reconfigurable multimedia collaboration system that implements SIP functionality and XML functionality in hardware, such as a field programmable gate array (FPGA).

BACKGROUND

Session Initiation Protocol (SIP) and Extensible Markup Language (XML) are among the most adopted standards in the telecommunications and IT industries. SIP is used to establish multimedia sessions with multiple participants through the Internet. It is used substantially with Voice over IP (VoIP) and provides the basis for several standards including IP Multimedia Systems (IMS). It is used presently to control the communication sessions of multiple participants in regards to the exchange of audio and video packets and via its extensions to control the Instant Messages exchanges.

XML is used significantly for web services, content publishing and forms the basis for standards related to Voice over IP (VoIP) applications like Presence Information Data Format (PIDF, and VoiceXML. When coupled together SIP and XML offer numerous multimedia and communication features including: (a) VoIP call establishment (b) Instant Messaging, (c) Presence, (d) paging, (e) audio and video conferencing and (f) voicemail. Many other extensions to the way people communicate can be added to the above. For a good period of time, the W3C organization, OASIS, and other world-wide organizations worked intensively to setting-up an Internet infrastructure through which enterprises can do business supported by automated processes governed by computers. The internal mechanisms are all XML based and form what is presently known as Publisher-Subscriber infrastructures.

All the processes, protocol, and algorithms form a layered software infrastructure for the control and transport of media and data related Internet present and next generation services. Some of these software processes might impede on the delay implied by processing these layers in software. It is therefore, a need to move all possible computational processes in a corresponding hardware in order to save time during sessions.

This disclosure presents a high level description of an embedded system referred to as a Reconfigurable Multimedia Collaborative System (RMCS). The RMCS acts as a processor performing SIP and XML related tasks at the hardware level, which presently are all implemented in software servers or gateways. The hardware implementation of the combined SIP and XML computational processes is unique. The implementation of the RMCS relieves the computers and computer communication networks from a series of computational processes, as they are executed in the RMCS hardware, while its applications are multifold from an industrial and commercial point of view. The RMCS can be deployed or inserted into any VoIP or unified communication related system such as consumer devices, servers and gateways. With the RMCS embedded in VoIP systems, the telecommunications industry will benefit from augmented performance, scalability and device interoperability. It is also noteworthy that RMCS can serve as a central part of an IP Multimedia Subsystem (IMS) which is considered one of the important wireless standards, initially defined by 3G IP forum.

One example of the RMCS is a nursing home equipped with RFID sensors and patients wearing small devices that are SIP and RFID enabled. When patients move around the nursing home, their presence (i.e. location) is updated through a WLAN when it changes. This simple technology where RFID, SIP and XML are coupled can offer caregivers an efficient, cost effective and fast methodology to monitor the locations of multiple patients simultaneously and provide urgent medical care as needed. The RMCS could also be implemented in small WLAN paging devices that can be used in restaurants or retail stores. As customers arrive to a busy restaurant, the customer is given a mini-pager and is asked to browse the mall until a seat is available which will be communicated through the WLAN pager.

Another usage of the RMCS is in the core of an IP Multimedia Subsystem (IMS). The IMS tasks are related to the delivery of the IP Multimedia to the mobile users. As of now there is not yet an appealing IMS implementation due to incomplete deployment of a series of protocols specified by various forums and their projects related to IMS such as 3GPP, GPRS, TISPAN, etc. Under these considerations, RMCS can accelerate the deployment of the needed set of protocols which will allow a more flexible access and usage to multimedia and especially voice applications over the fixed and mobile devices in a unitary way.

This section provides background information related to the present disclosure which is not necessarily prior art.

SUMMARY

A reconfigurable multimedia collaboration system is provided. The system includes: a SIP engine implemented in hardware that executes functions defined by Session Initiation Protocol (SIP); a XML engine implemented in hardware that executes functions defined by Extensible Markup Language (XML); and an interface that manipulates a set of registers used to communicate with a software component and coordinates functions executed by the SIP engine and the XML engine. The system is preferably implemented in a reconfigurable hardware platform, such as FPGA.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

FIG. 20 provides an example of a SIP INVITE packet with a SDP session description.

FIG. 21 provides an example of a 200 OK packet.

FIG. 22 provides an example of an ACK packet.

FIG. 23 provides an example of a BYE packet.

FIG. 24 provides an example of a SUBSCRIBE packet.

FIG. 25 provides an example of a SIP NOTIFY packet with a PIDF message.

FIG. 26 provides an example of a MESSAGE packet.

Figure 27:
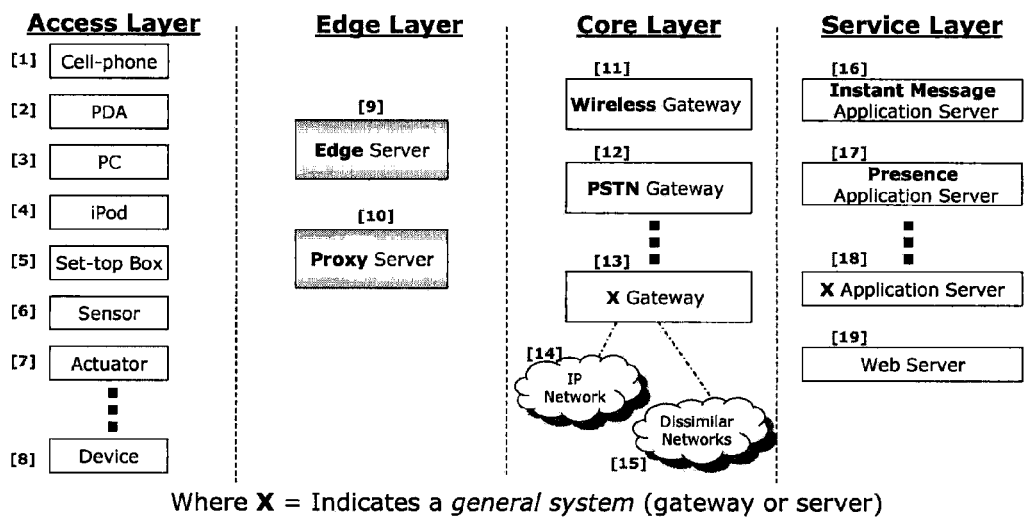

FIG. 27 illustrates computing layer in which RMCS can be embedded into.

Figure 28:
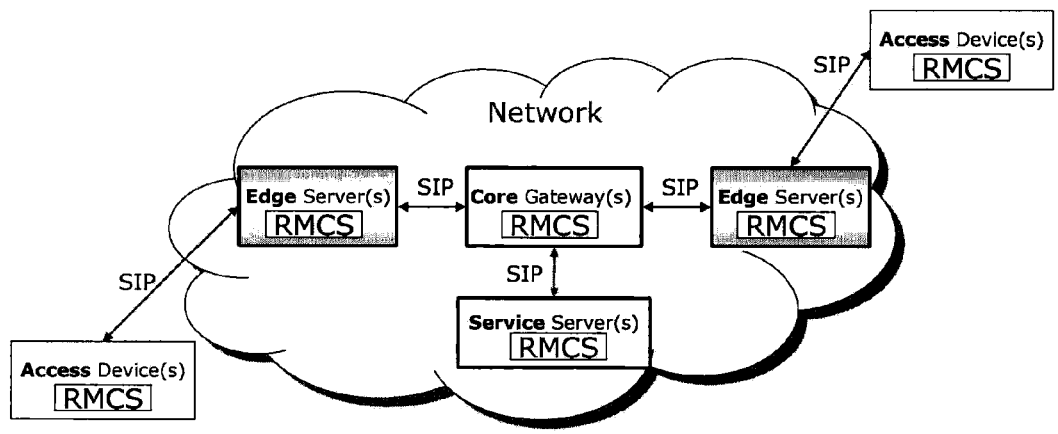

FIG. 28 is a diagram illustrating how RMCS can be integrated with different types of network devices.

Figure 29:
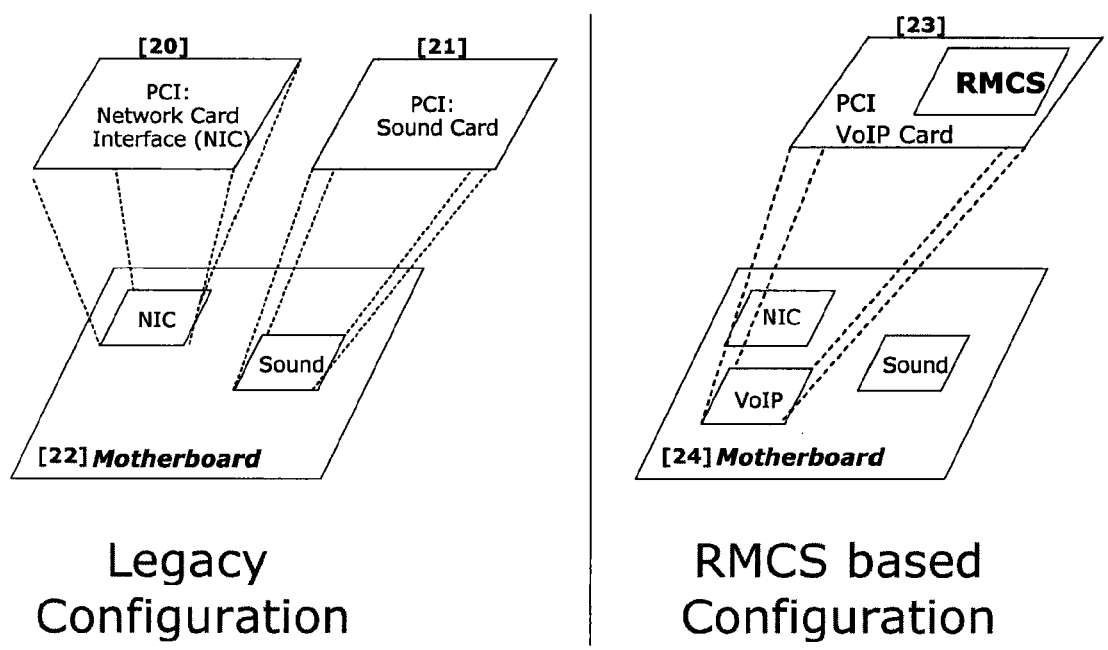

FIG. 29 is a diagram illustrating how RMCS can be integrated within consumer devices.

Figure 30:
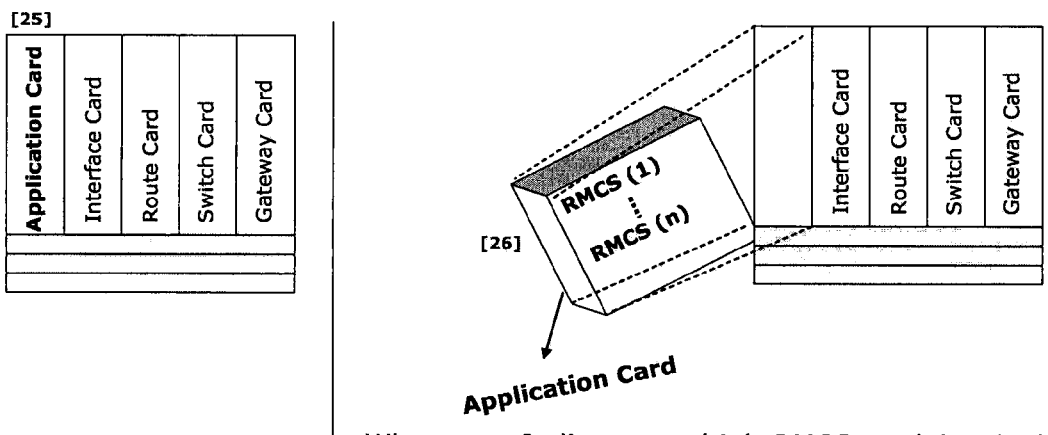

FIG. 30 is a diagram illustrating how RMCS can be deployed within network gateways and servers.

Figure 31:
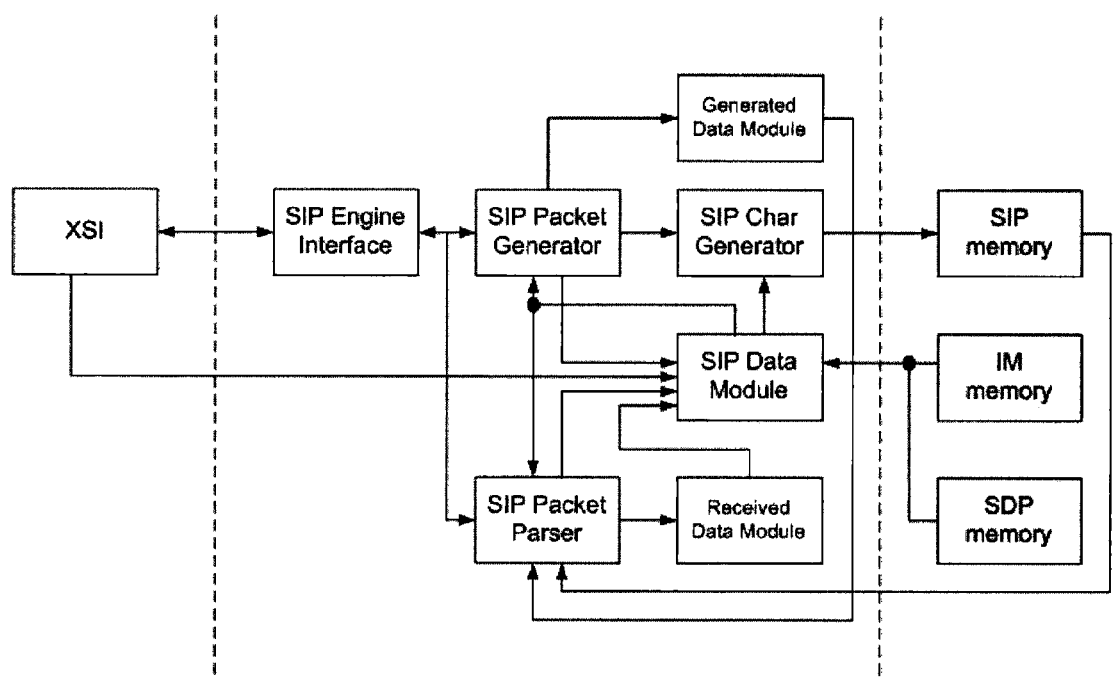

FIG. 31 is a block diagram depicting a high level architecture of the SIP Engine.

Figure 32:
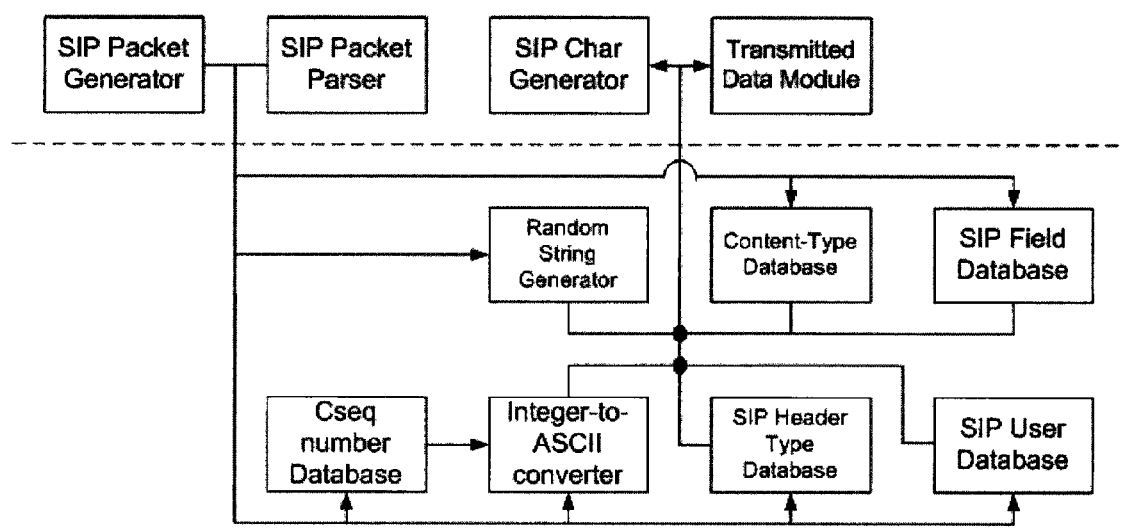

FIG. 32 is a block diagram depicting the components of the SIP data module in the SIP Engine.

Figure 33:
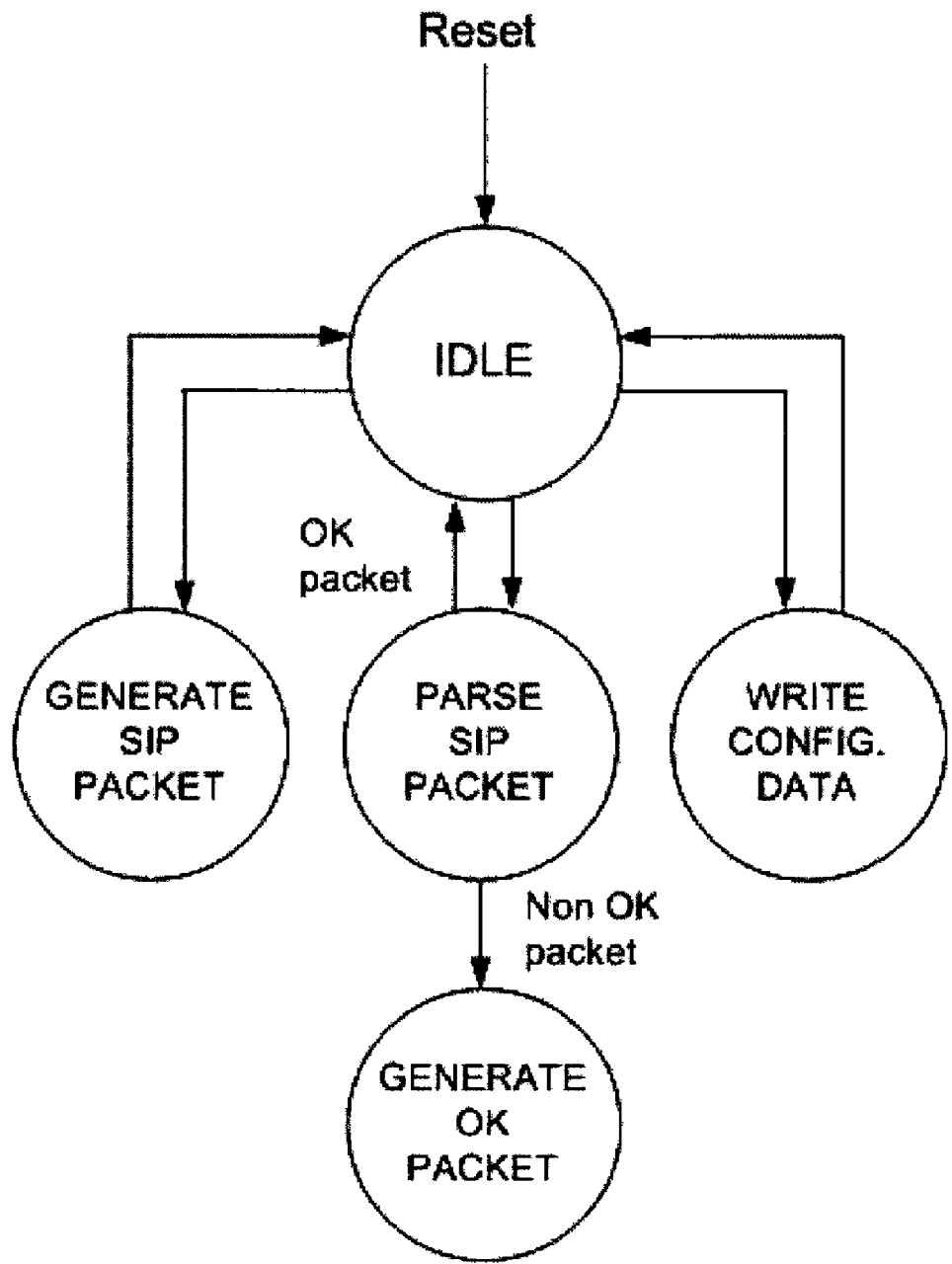

FIG. 33 is a diagram of a finite state machine describing the functionality of the interface for the SIP Engine.

Figure 34:
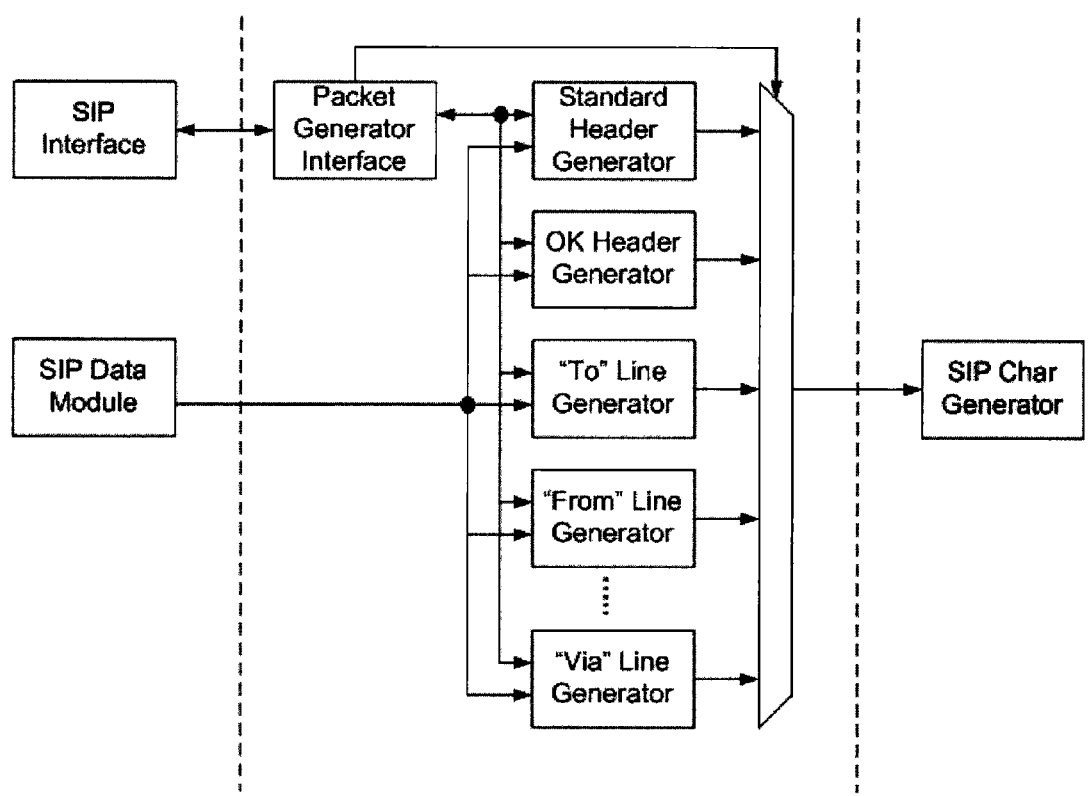

FIG. 34 is a block diagram depicting components of the SIP Packet Generator for the SIP Engine.

Figure 35:
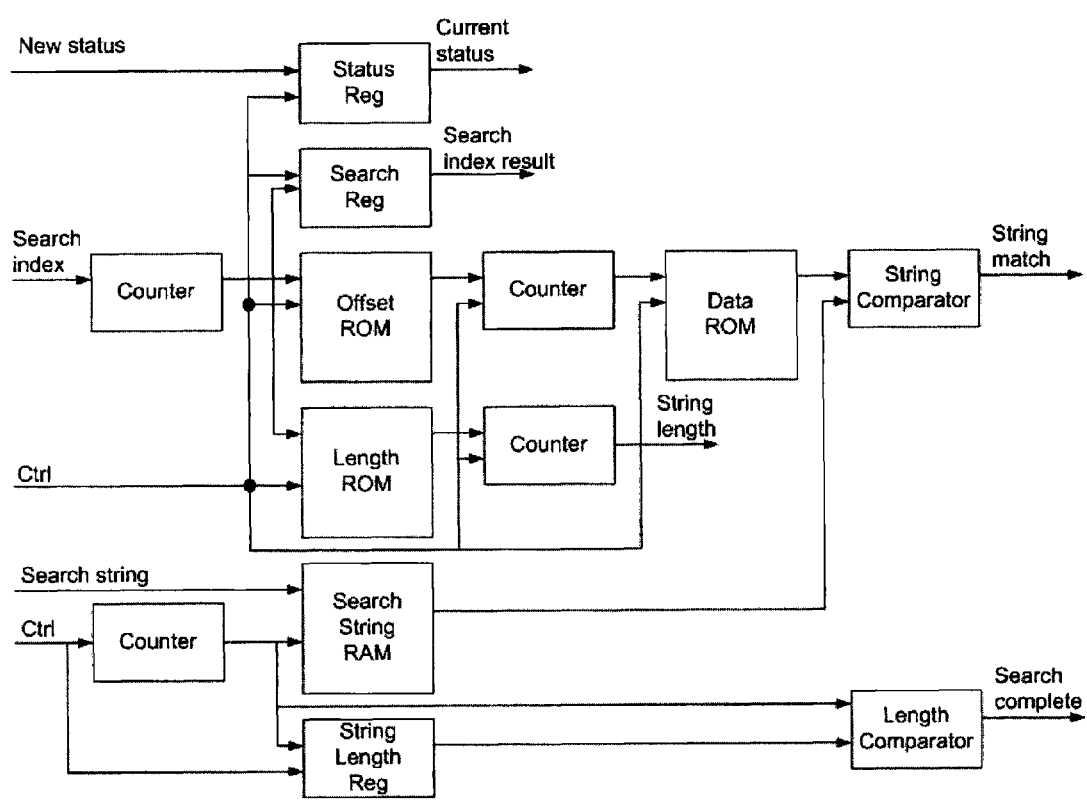

FIG. 35 is a diagram illustrating the data path of the database components in the SIP generator.

Figure 36:
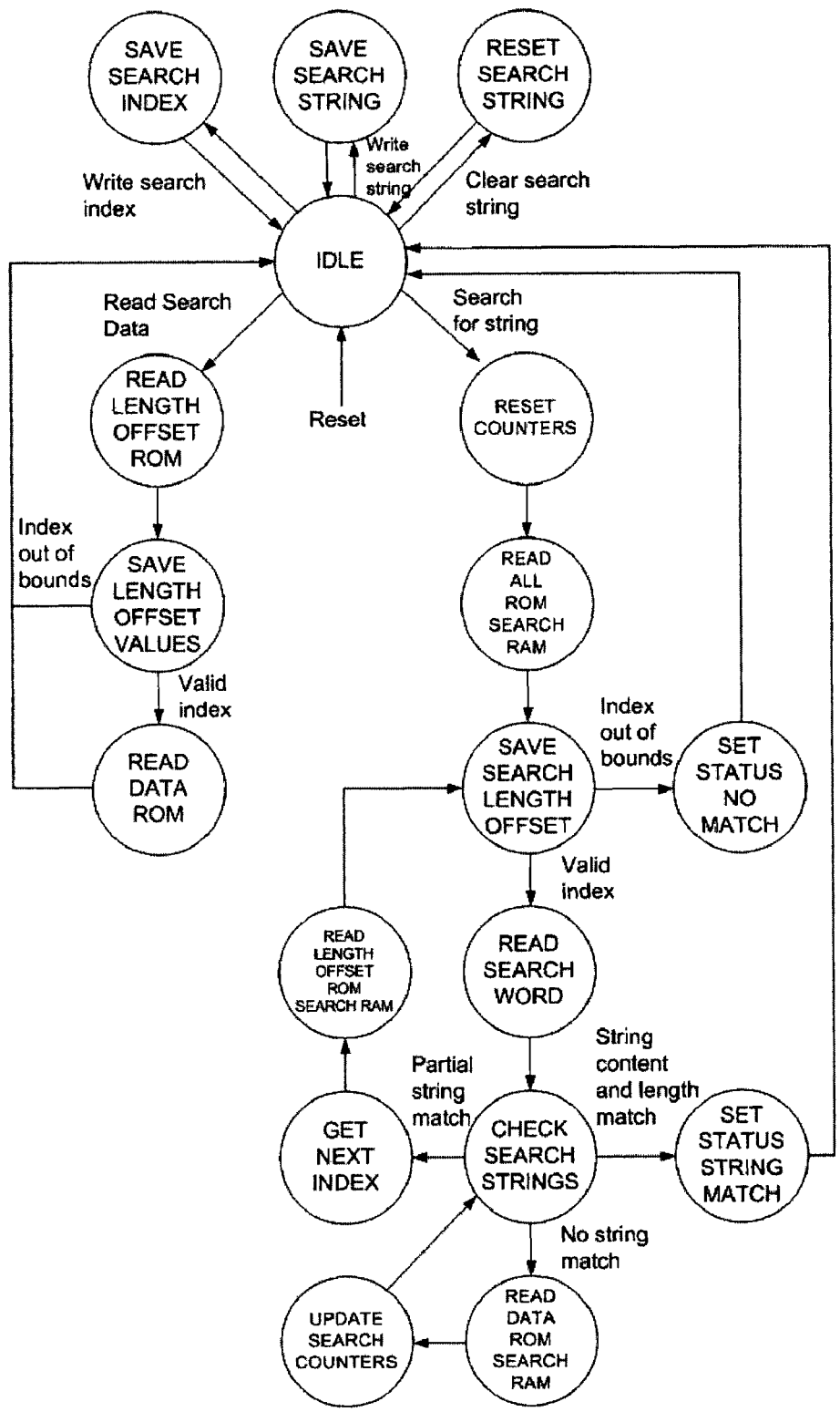

FIG. 36 is a block diagram depicting components of the control unit of the database components in the SIP generator.

Figure 37:
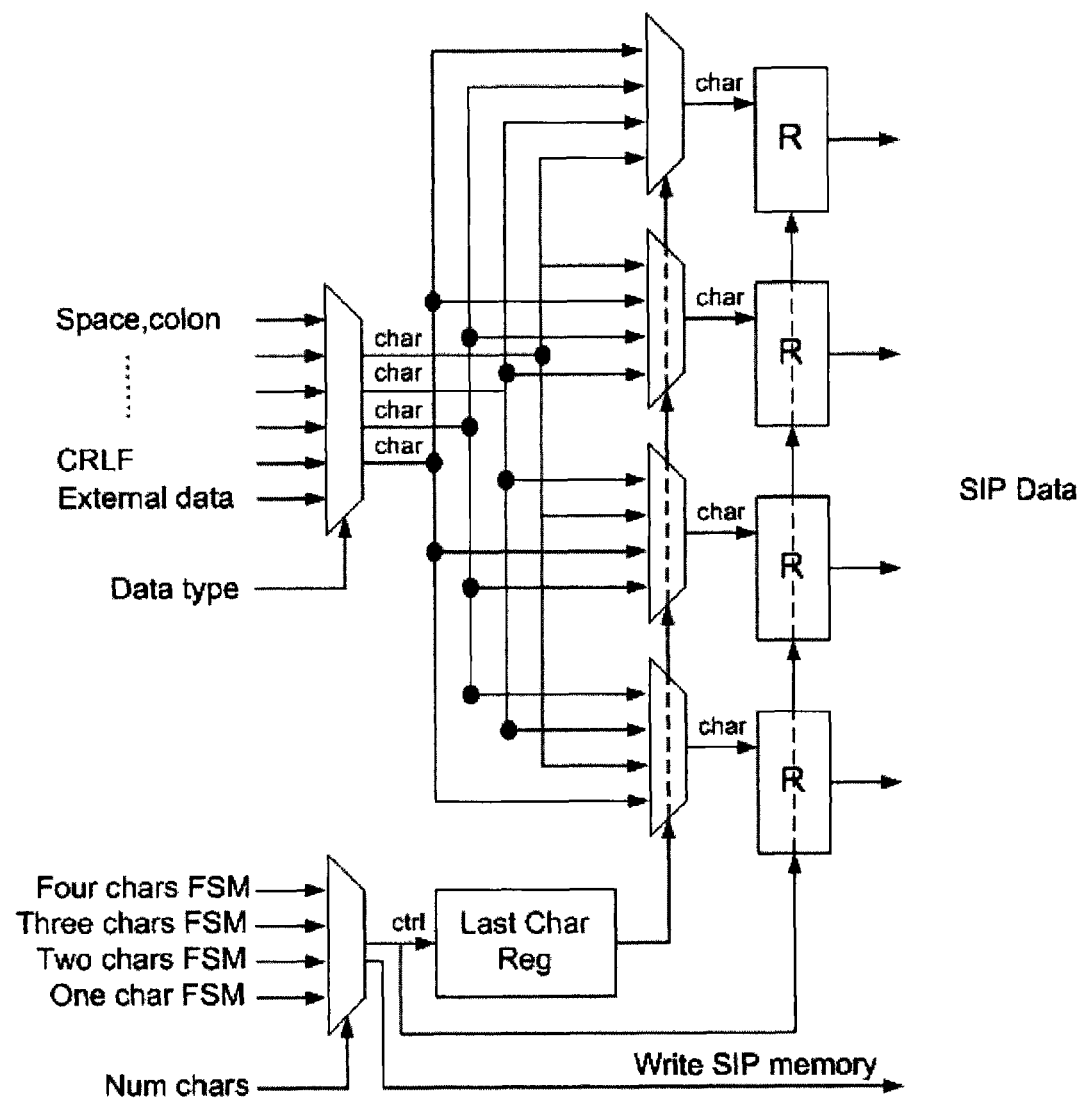

FIG. 37 is a diagram illustrating the data path of the SIP character generator.

Figure 38:
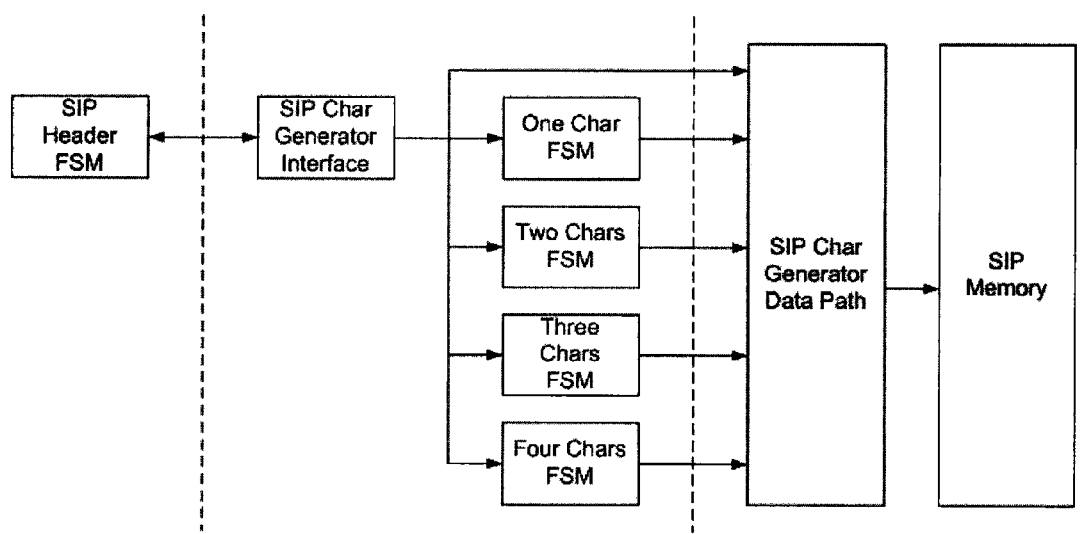

FIG. 38 is a block diagram depicting components of the control unit for the SIP character generator.

Figure 39:
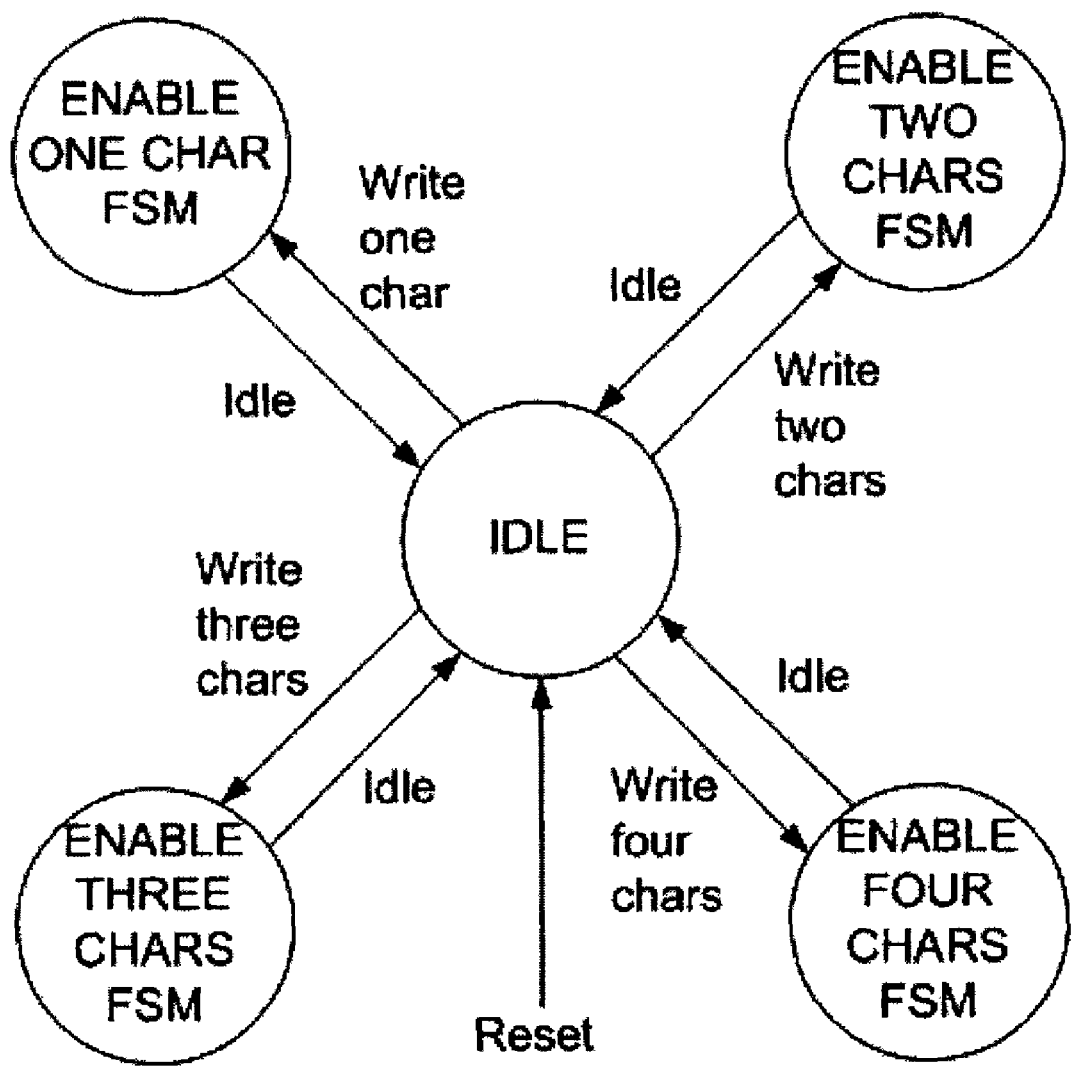

FIG. 39 is a diagram of a finite state machine describing the functionality of the interface for the SIP character generator.

Figure 40:
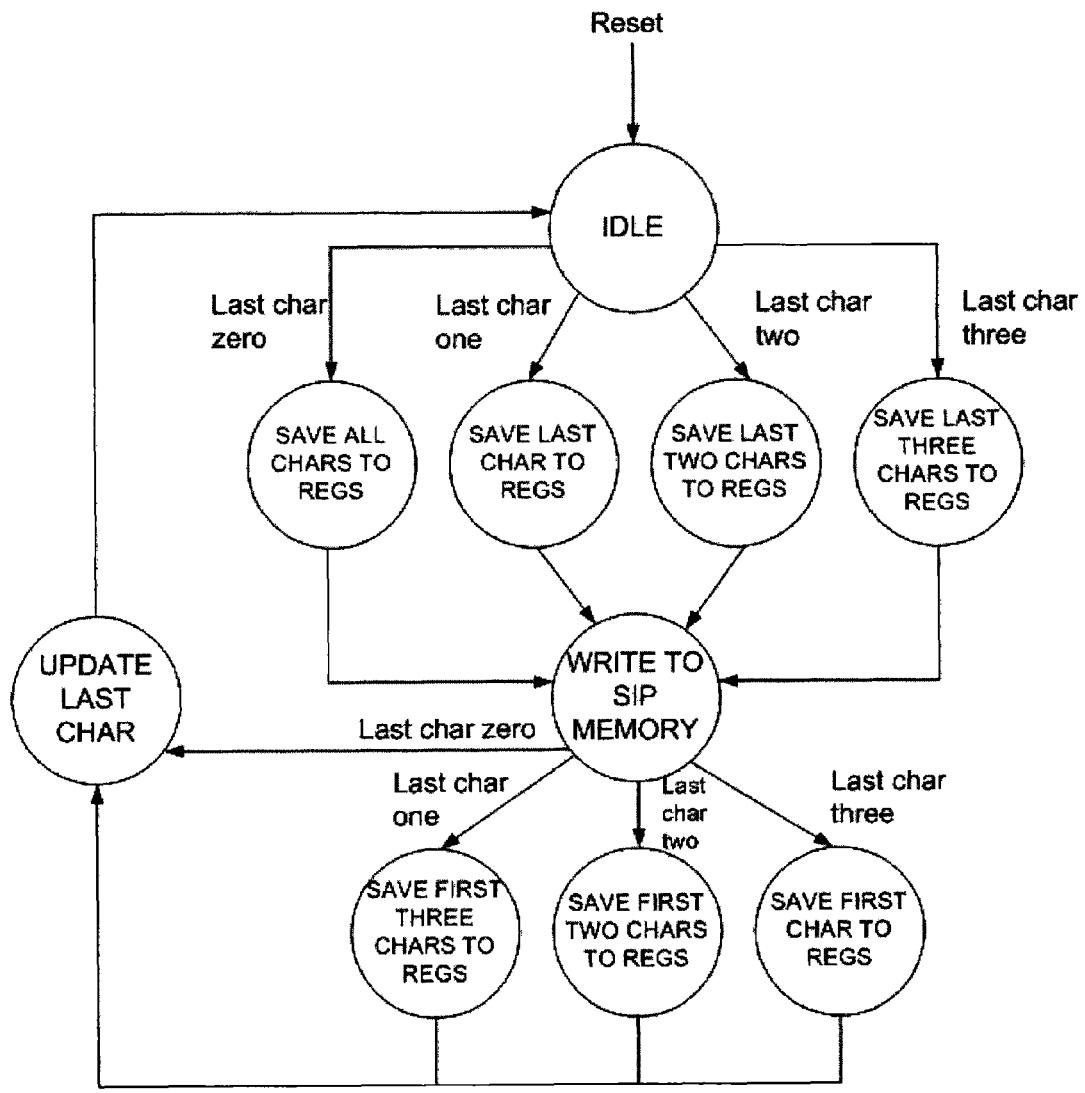

FIG. 40 is a diagram of a finite state machine used to generate four characters by the SIP character generator.

Figure 41:
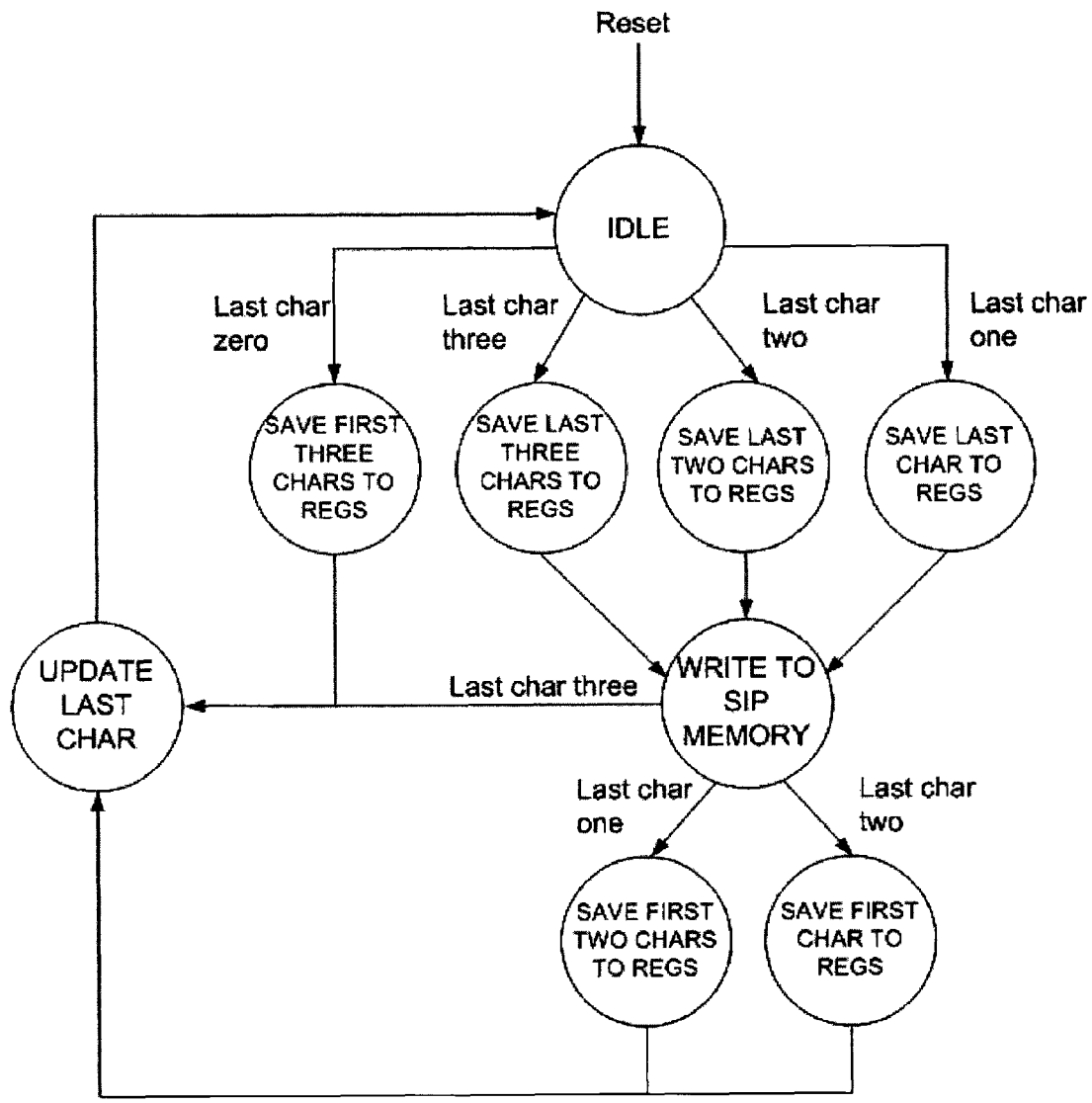

FIG. 41 is a diagram of a finite state machine used to generate three characters by the SIP character generator.

Figure 42:
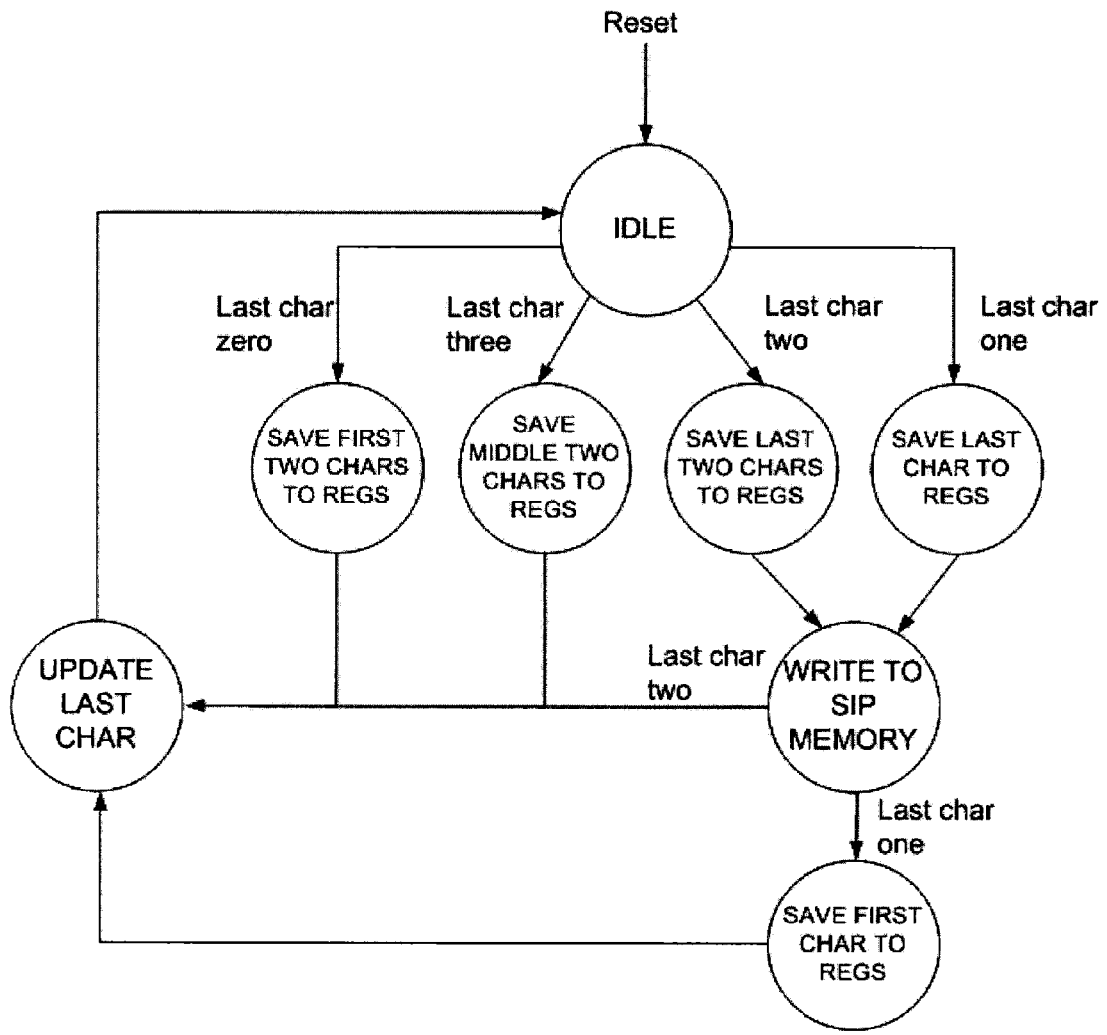

FIG. 42 is a diagram of a finite state machine used to generate two characters by the SIP character generator.

Figure 43:
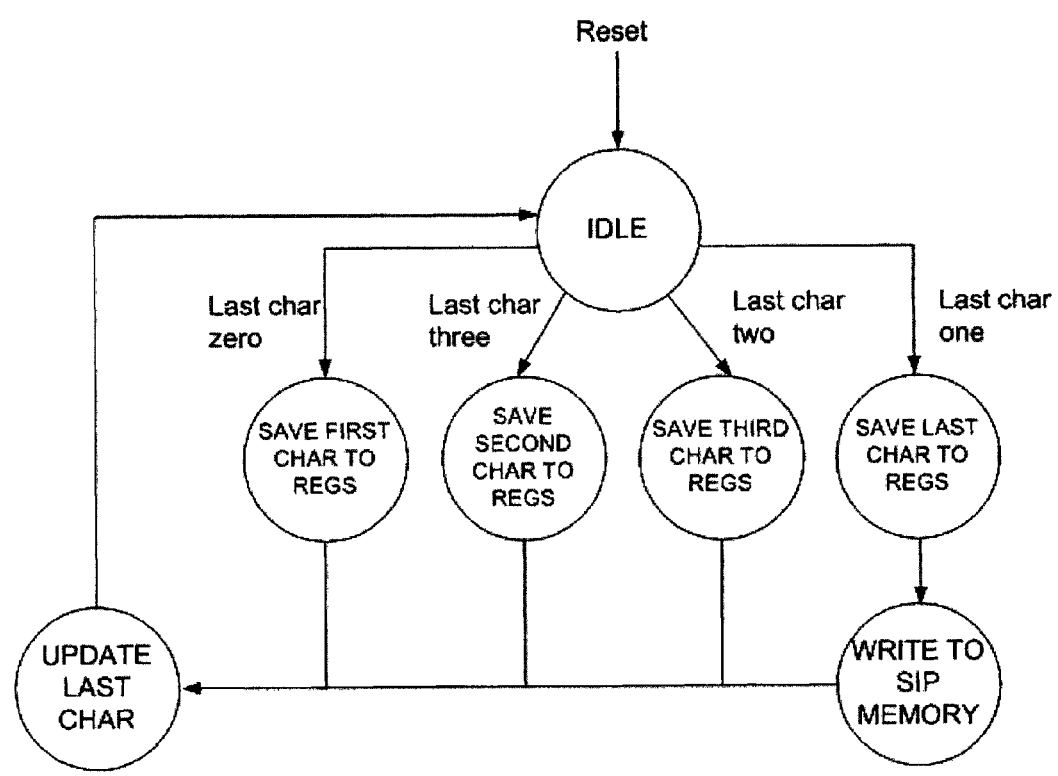

FIG. 43 is a diagram of a finite state machine used to generate one character by the SIP character generator.

FIG. 44 demonstrates an example of the Presence Information Data Format (PIDF).

Figure 45:
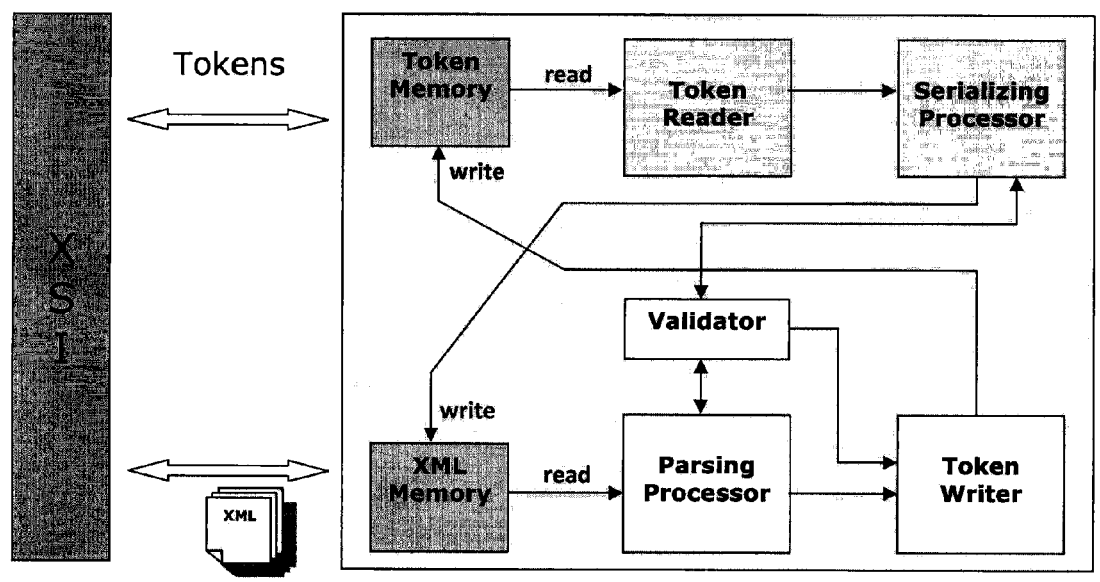

FIG. 45 is a block diagram illustrating a high level architecture of the XML Engine.

Figure 46:
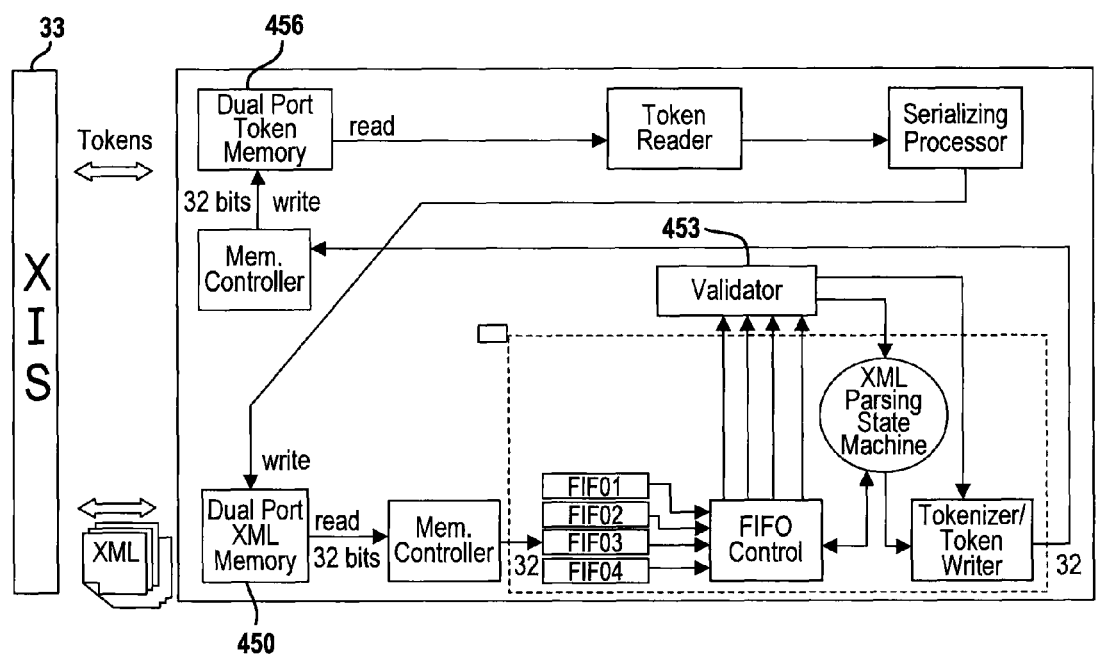

FIG. 46 is a block diagram depicting the components of the XML Parsing Processor.

Figure 47:
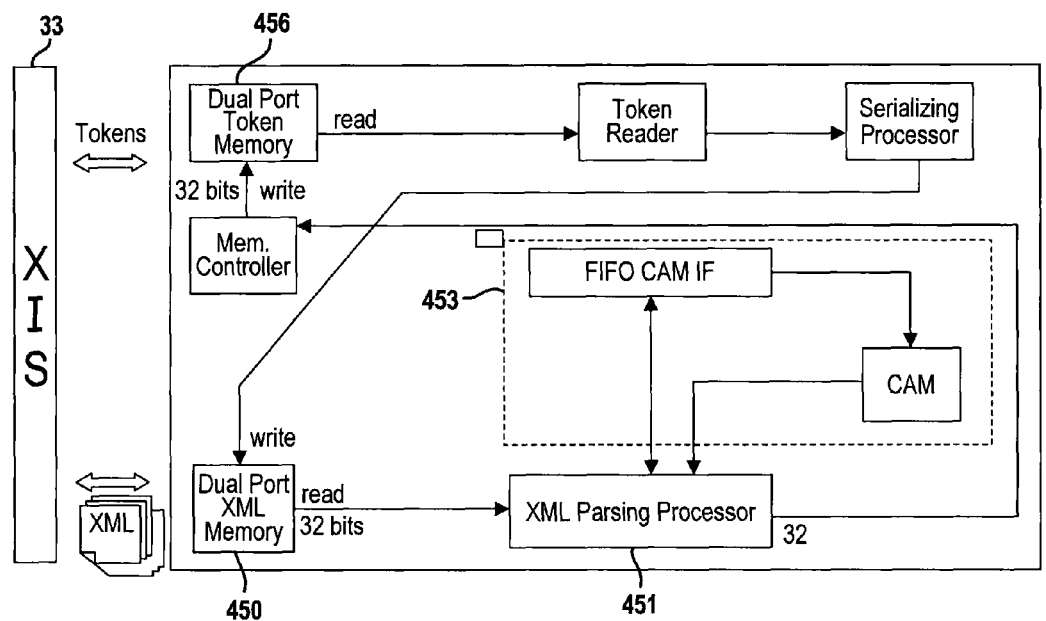

FIG. 47 is a block diagram depicting the components of the XML Validator.

Figure 48:
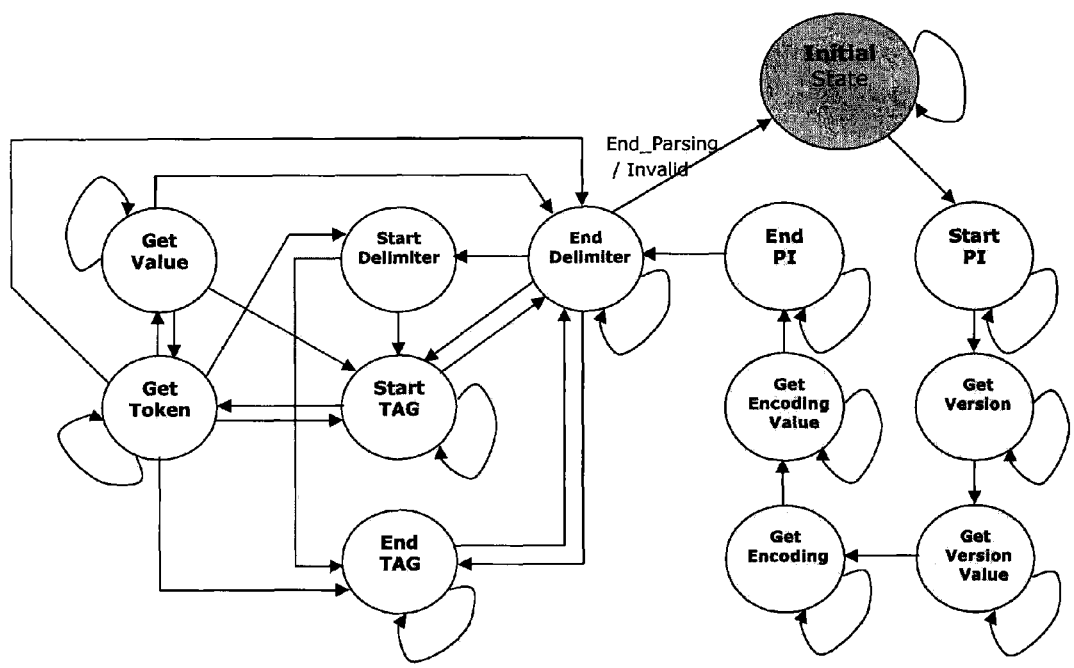

FIG. 48 is a diagram of a finite state machine describing the functionality of the XML Parsing Processor.

Figure 49:
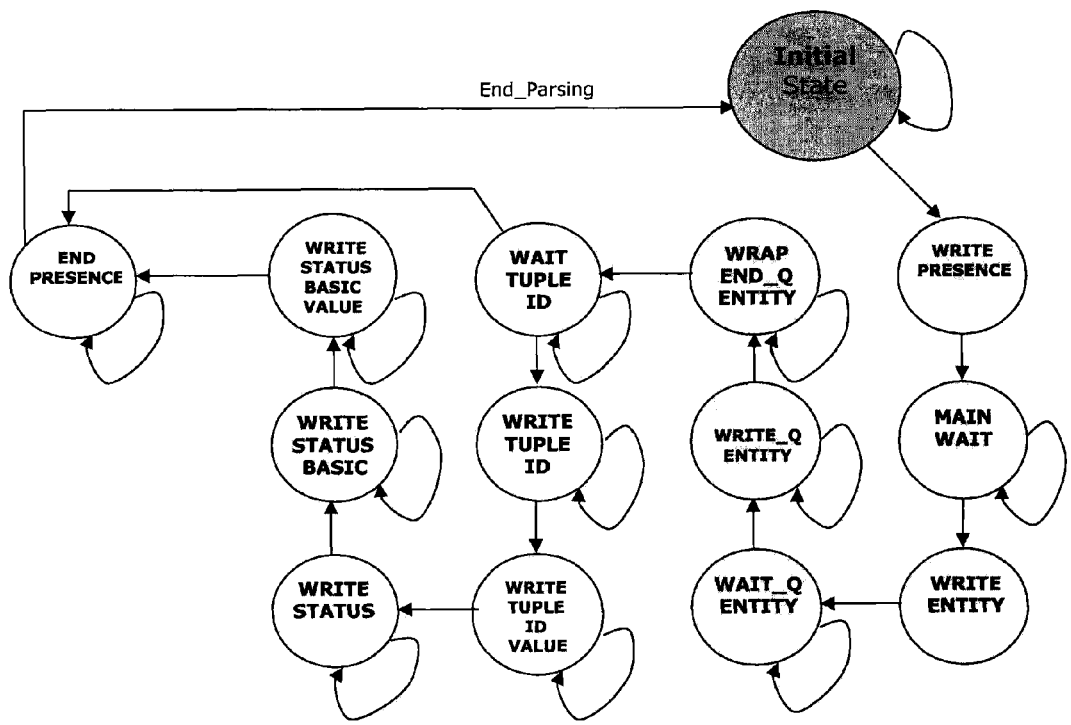

FIG. 49 is a diagram of a finite state machine describing the functionality of the XML Token Writer.

Figure 50:
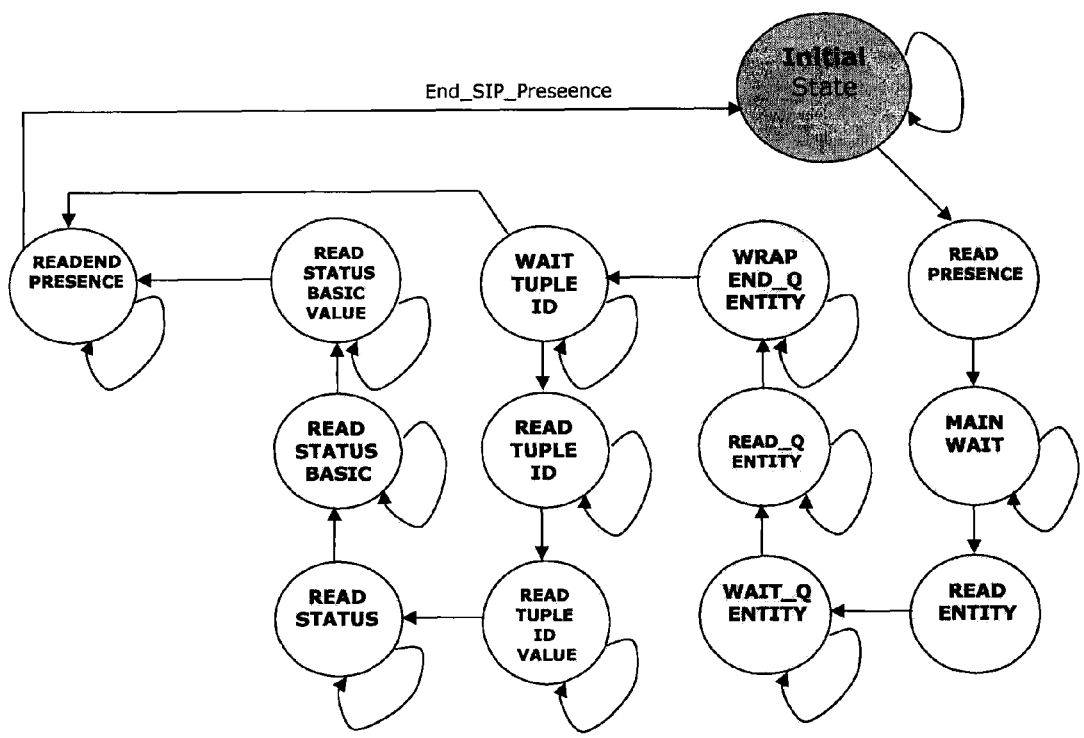

FIG. 50 is a diagram of a finite state machine describing the functionality of the Token Reader.

Figure 51:
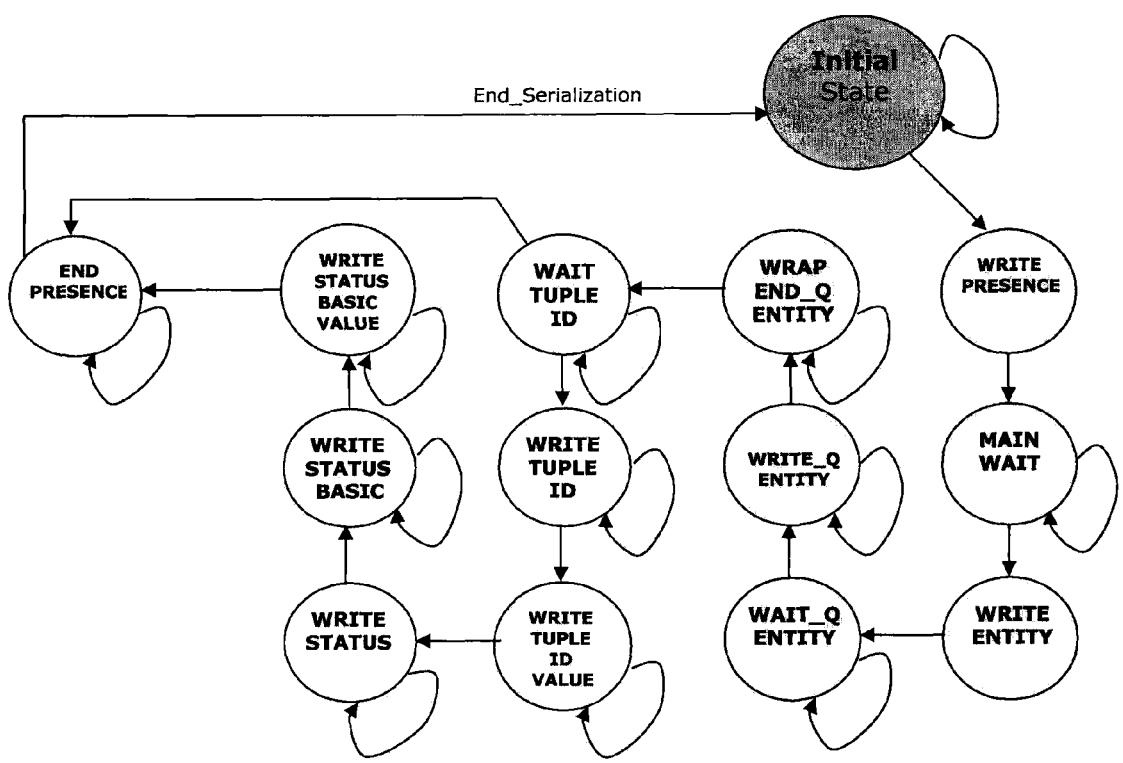

FIG. 51 is a diagram of a finite state machine describing the functionality of the XML Serializer.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Figure 1:
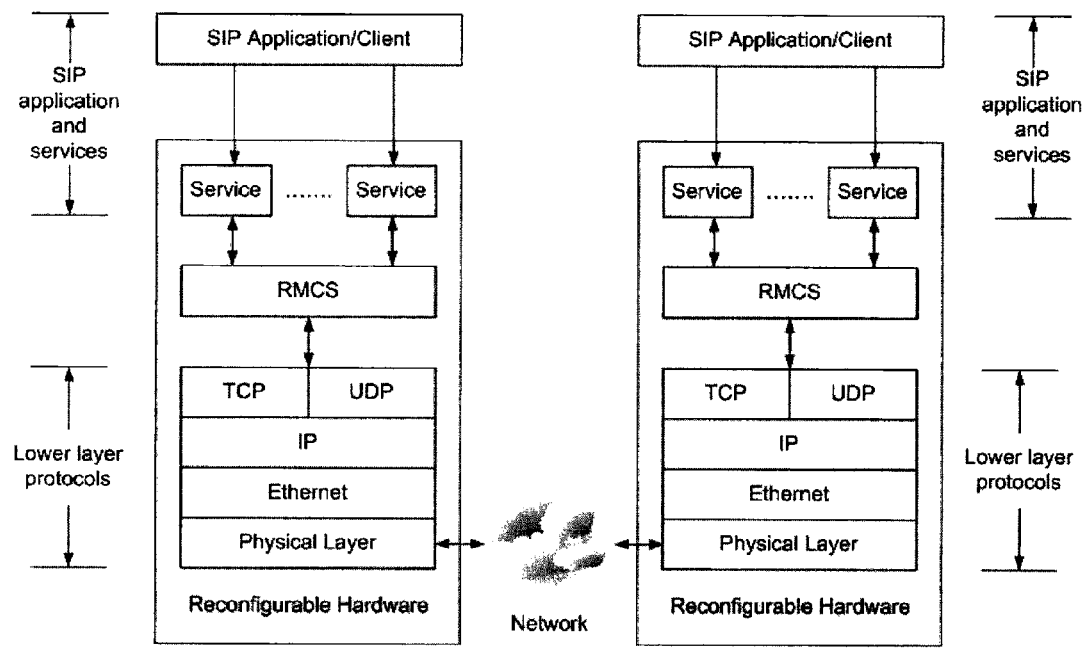
FIG. 1 is a diagram illustrating how a reconfigurable multimedia collaboration system (RMCS) interacts with other components in a network environment.

FIG. 1 illustrates how a RMCS 12 interacts with other elements in an end-to-end SIP communications system 10. The RMCS 12 resides on a reconfigurable hardware platform 14 and is used by SIP services 16 to execute SIP functionality as further described below. Services may include, but are not limited to, hardware blocks implementing high level functionality like P2P networking, publisher/subscribe semantics and IP Multimedia Subsystems (IMS) services as defined in IMS literature. Other types of services are also contemplated by this disclosure. Lower layer communications protocols 18 may be used by the RMCS 12 to communicate with other RMCS 12 residing in the computer network environment. In a preferred embodiment, the reconfigurable hardware platform 14 is a field programmable gate array (FPGA). However, other hardware implementations, such as a System on Chip (SoC) with an application specific integrated circuit, are also contemplated.

Figure 17:
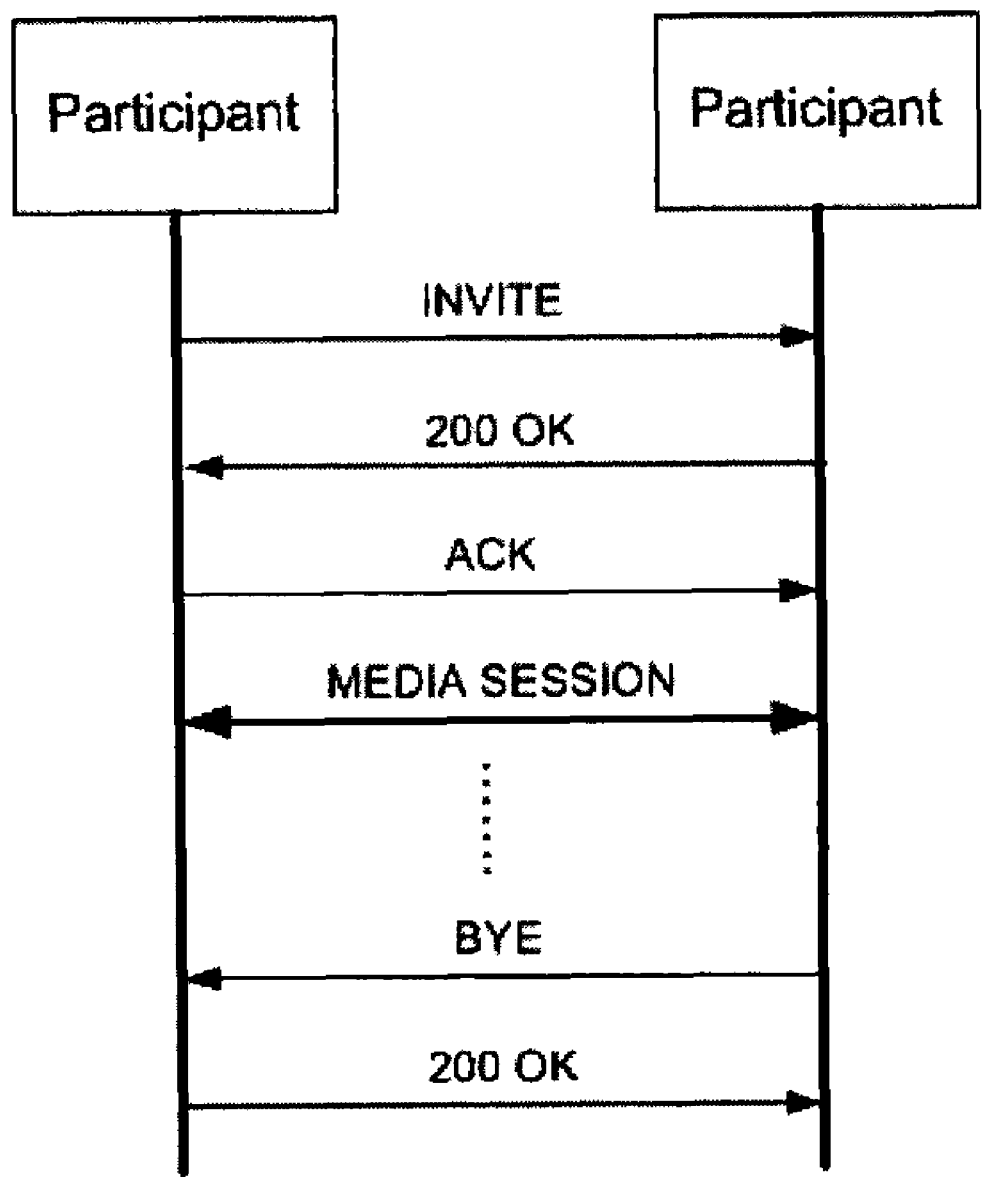
FIG. 17 is a diagram demonstrating the operation of establishing a multimedia session in accordance with SIP.

SIP functionality is briefly described below in order to provide some context for setting forth the RMCS architecture in detail. FIG. 17 illustrates the operation of establishing a multimedia session in accordance with SIP. One participant transmits an INVITE message to another participant. Session information is described in the payload of the INVITE message using the Session Description Protocol (SDP). If the second participant wishes to accept the request a session a 200 OK message is sent back to the first participant. The first participant responds with an ACK (acknowledgement) message and the session is now established. Either participant may terminate the session by sending a BYE message that must be acknowledged with a 200 OK message. Examples of INVITE, 200 OK, ACK and BYE messages are shown in FIG. 20, FIG. 21, FIG. 22 and FIG. 23 respectively.

Figure 18:
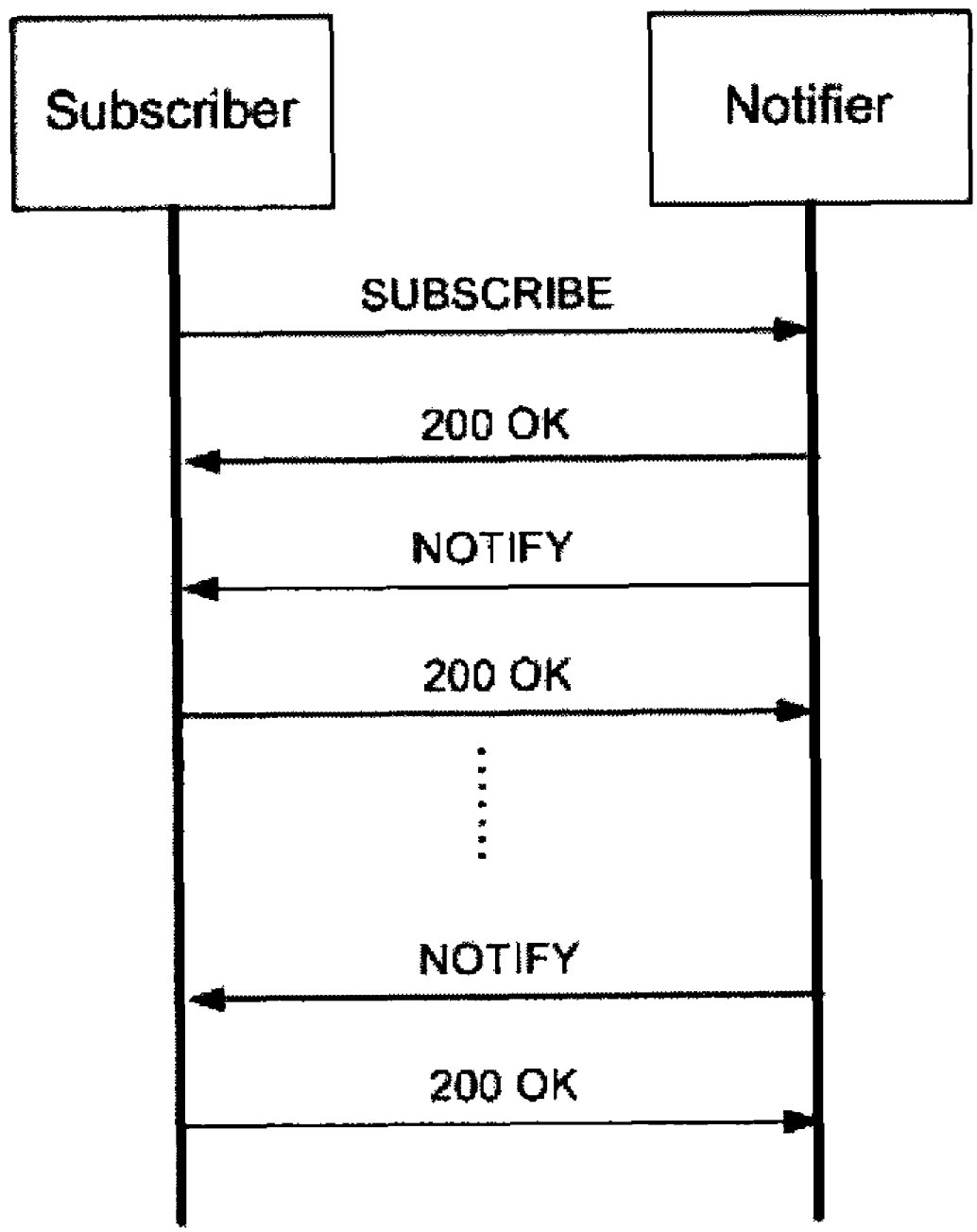
FIG. 18 is a diagram demonstrating the operation of exchanging presence information in SIP.

Presence information may also be exchanged with SIP as shown in FIG. 18. A SUBSCRIBE message is transmitted by an individual wanting to know the presence information of another SIP user. If the SUBSCRIBE request is accepted a 200 OK message is transmitted back to the user. Every time the presence is updated a NOTIFY message is transmitted to all individuals who successfully sent SUBSCRIBE messages. All NOTIFY messages must be acknowledged with a 200 OK message. Examples of SUBSCRIBE and NOTIFY messages are shown in FIG. 24 and FIG. 25 respectively.

Figure 19:
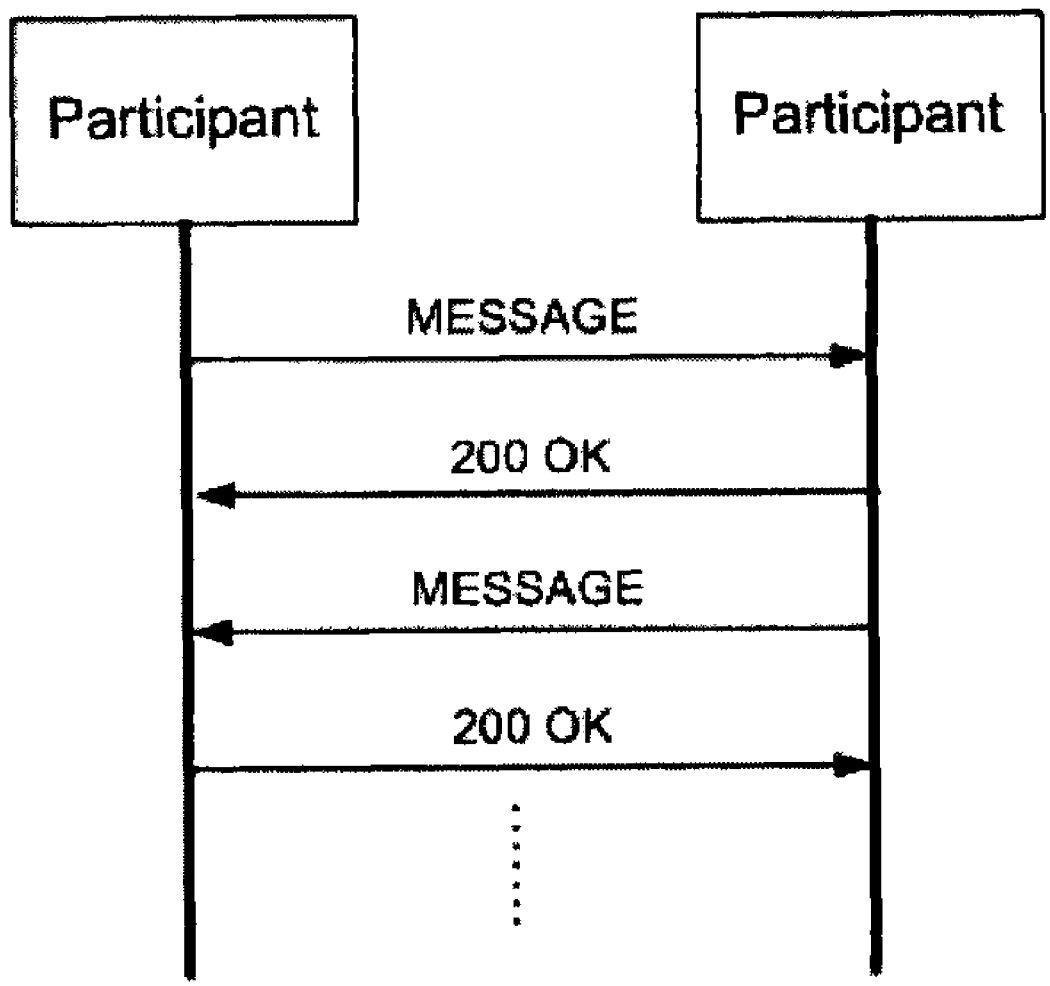
FIG. 19 is a diagram demonstrating the operation of exchanging instant messages in SIP.

Similarly, Instant Messages (IM) may be exchanged in SIP with MESSAGE commands as shown in FIG. 19. Every MESSAGE must be acknowledged with a 200 OK message. Participants may exchange IMs at any time with MESSAGE commands. An example of a MESSAGE command is shown in FIG. 26.

SIP is an ASCII based protocol with data separated among several lines. Each line is terminated with a consecutive carriage return and line feed (CRLF). The SIP header is separated from the payload by an extra CRLF. The payload may be represented in various formats depending on the type of SIP command. An INVITE command has a Session Description Protocol (SDP) payload. The payload of a MESSAGE command is directly interpreted as an instant message. A NOTIFY message commonly has a Presence Information Data Format (PIDF) payload. PIDF is an XML based standard for describing all the presence information of a given participant. Examples of SIP messages noted above are based on examples available in "Internet Communications Using SIP: Delivering VoIP and Multimedia Services with Session Initiation Protocol, Second Edition" by Henry Sinnreich and Alan B. Johnston. Further details about the SIP specification may be found in RFC 3261. While the following description is provided with reference to SIP, it is envisioned that broader aspects of the RMCS and this disclosure are applicable to other types of signaling protocols, such as H.323 protocol, SS7 protocol, etc.

Figure 2:
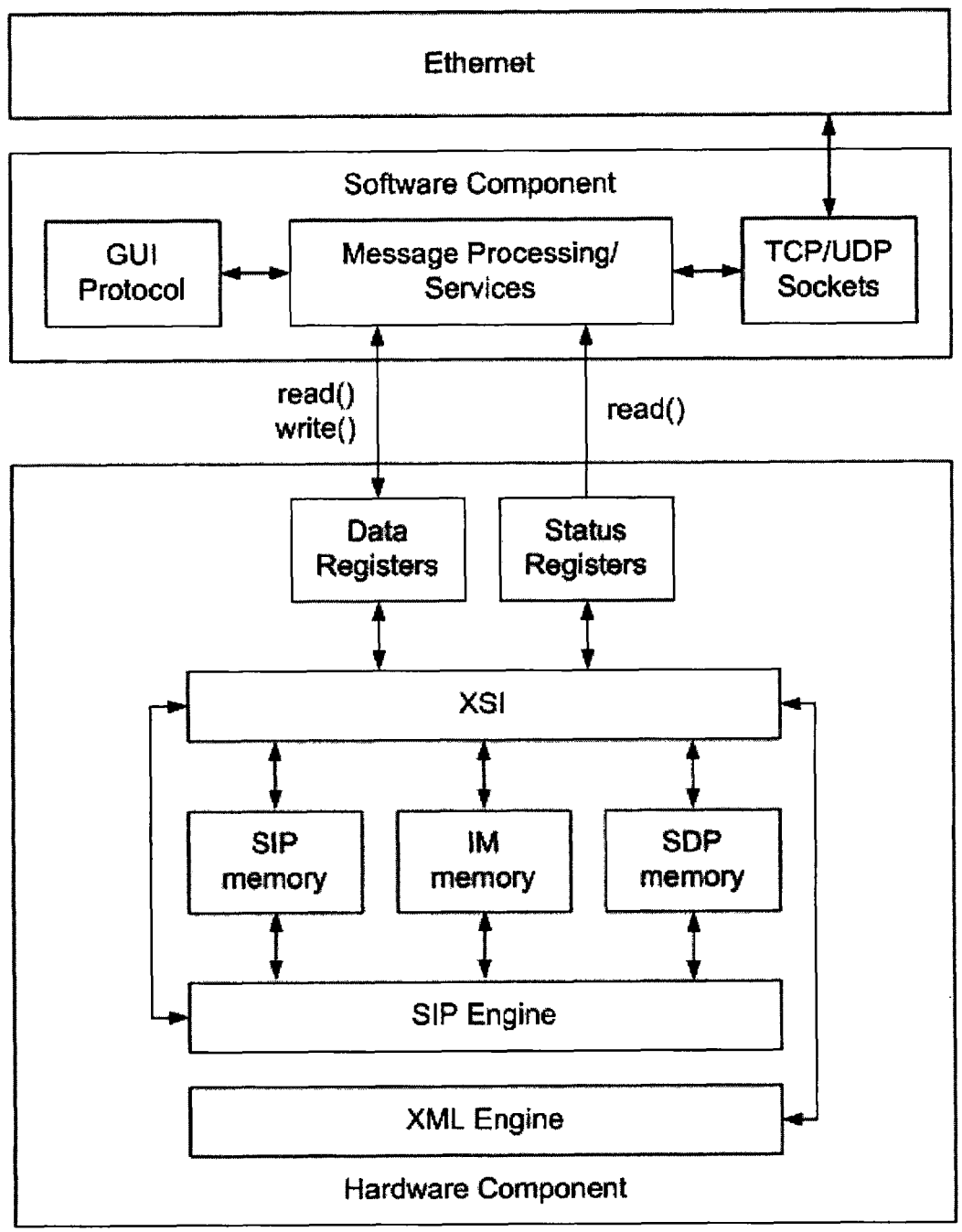
FIG. 2 is a block diagram depicting the high level architecture of the RMCS.

FIG. 2 illustrates an exemplary high level architecture for the RMCS 12. The RMCS is comprised generally of a software component 20 and a hardware component 30. The software component 20 of the RMCS is used to communicate with a SIP entity regarding configuration and feedback. The software component 20 communicates through a separate communication protocol for exchanging information. The software component 20 is comprised generally of a message processing service 21 and UDP or TCP sockets 22. The message processing service 21 receives data packets formatted in accordance with SIP and generate commands for manipulating a set of registers 23, 24 in response thereto. Sockets 22 may be used by the software component 22 to establish connections with remote devices and thereby exchange data over a computer network. The hardware component 30 of the RMCS 12 is used for performing the majority of processing and generation with respect to SIP based data packets as further described below.

Figure 3:
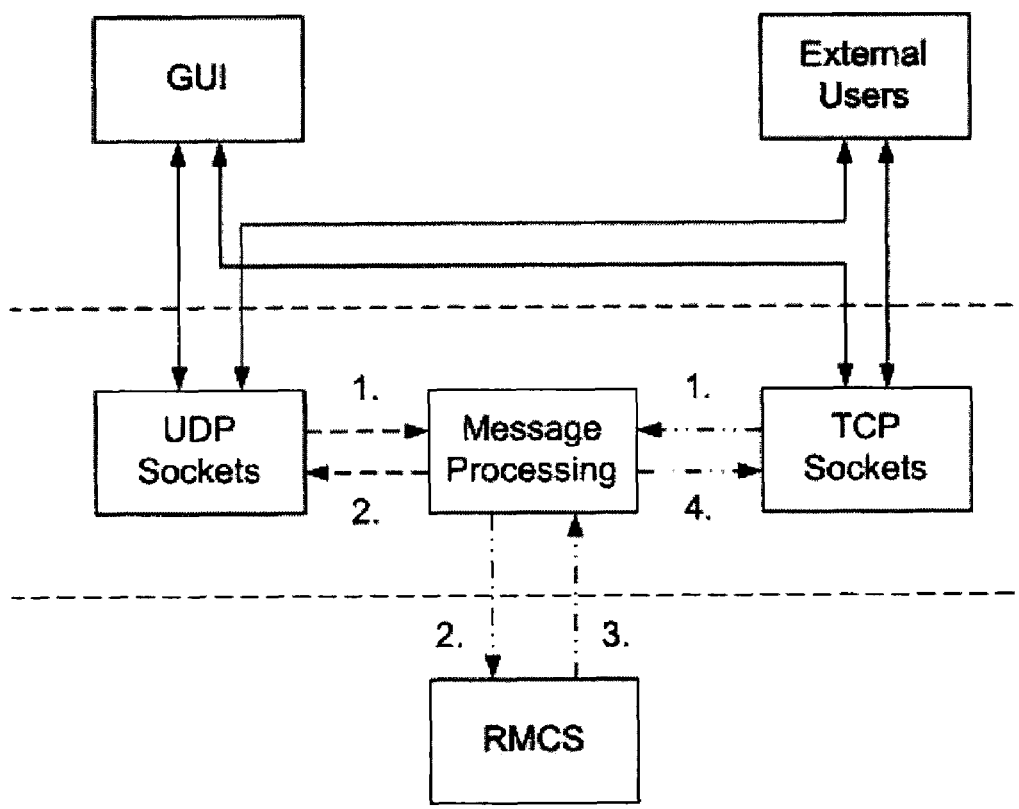
FIG. 3 is a diagram further depicting a software component of the RMCS.

The functionality of the software component 22 is further described in relation to FIG. 3. Messages are received from graphical user interfaces 41 or external users 42 (such as other RMCS) through either UDP sockets 43 or TCP sockets 44. This information is processed to determine its destination and is forwarded unaltered. RMCS commands and text based messages may be sent through TCP connections. This information is processed and may result in RMCS interaction to retrieve or manipulate relevant data. Responses are sent back to the appropriate party through TCP. This allows RMCS to communicate with either a hardware or software implementation of IMS, respectively SIP servers or clients.

With continued reference to FIG. 2, data and status registers 23, 24 comprise the interface to the hardware component 30. Information is read from both status and data registers 23, 24 while data is written to the RMCS through data registers 23 alone. The functionality of the hardware component 30 of the RMCS may be further divided into three modules: a SIP engine 31, a XML engine 32 and an XML and SIP Interface 33 (XSI). The SIP and XML engines perform the functionality for SIP and PIDF, respectively, to generate and process the appropriate information. Both modules share a common interface so data can be successfully transferred to and from software. This interface is implemented as a separate module and is referred to herein as XSI 33. The XSI 33 manipulates the data and status registers 23, 24 used to communicate with the software component 20 of the RMCS. Separate memory components 34, 35, 36 are used to store SIP, IM and SDP data. These memory components are accessible to and manipulated directly by the XSI 33 and the SIP engine 31.

Figure 4:
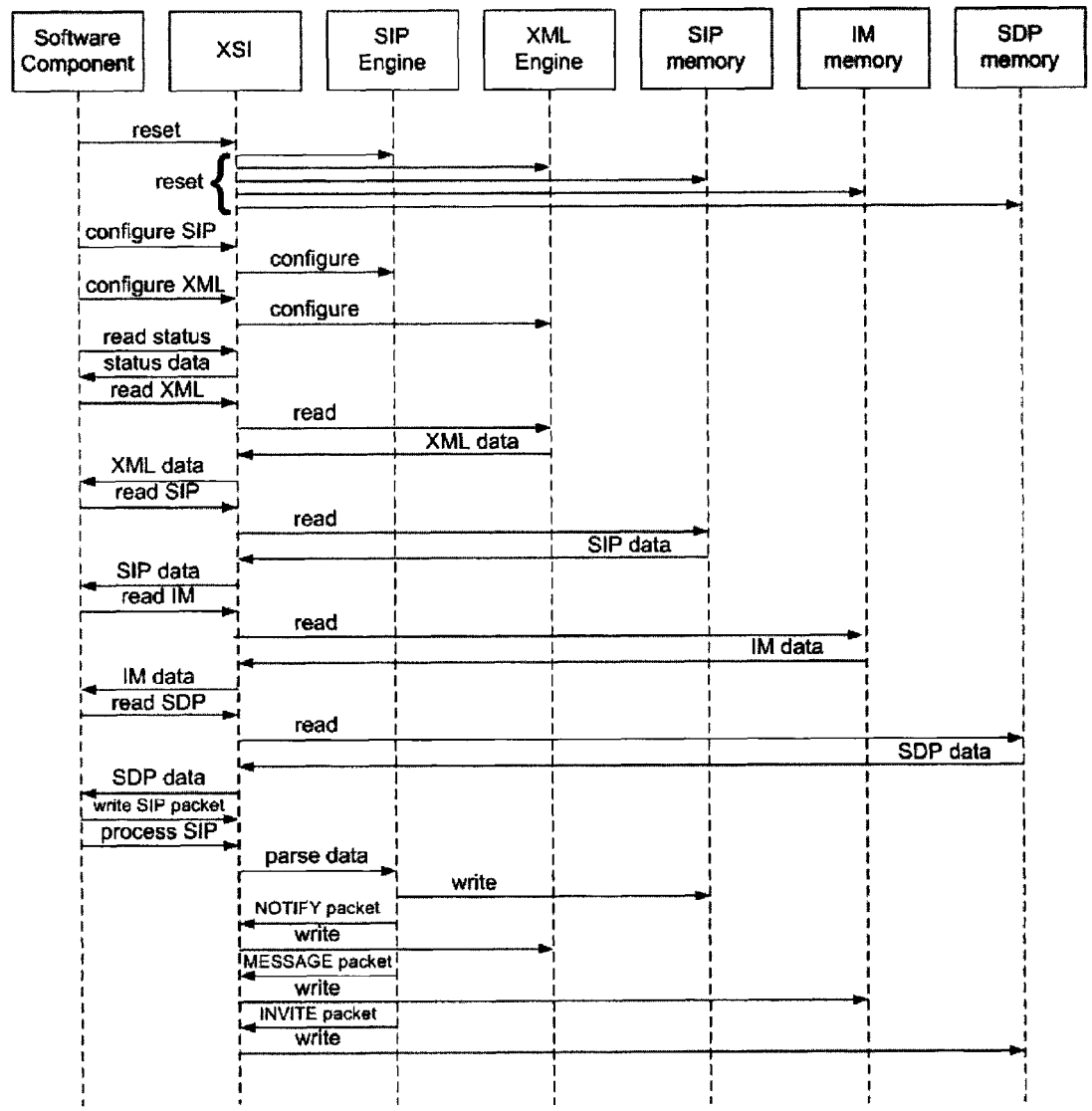
FIG. 4 is a sequence diagram illustrating various commands invoked by the software component of the RMCS.

Upon receipt of a data packet by the software component 20, interaction between the XSI, SIP Engine, XML Engine and various memory components is illustrated in FIG. 4. Numerous commands may be invoked from the software component 20 in response to receipt of a data packet. First, a reset command is written to the XSI 33 which is turn issues resent commends directly to each of the components. The SIP Engine 31 and XML Engine 32 are further configured through separate commands which provide necessary data to the engines before SIP packets are processed. Various read commands are also issued by the software component 20 to retrieve different types of data including status, XML, SIP, IM and SDP data. In each case, the XSI receives the read command, invokes the applicable module (when necessary), retrieves the data and passes it to the software component.

Next, the packet data is written to a buffer inside the XSI 33 for processing by the SIP engine 31. All other written data is configuration data of the SIP engine 31 or the XML Engine 32. When the command to process SIP data is sent from the software component 20, the XSI 33 invokes the SIP engine 31 to begin parsing SIP packet data. The SIP engine 31 writes parsed data into SIP memory 34 and passes the SIP packet type to the XSI 33 when it has been discovered. If the SIP engine 31 is parsing a NOTIFY packet, the payload is presumed to be a PIDF document (see FIG. 25) and is written to the XML engine 32 for further processing. When the SIP packet type is a MESSAGE packet, the payload is presumed to be an Instant Message (see FIG. 26) and is written to IM memory 35. Likewise, an INVITE packet should contain an SDP payload (see FIG. 20) so it is written to SDP memory 36. In one embodiment, payloads for other packet types are not processed; whereas, in other embodiments, XSI may be extended to process other packet types.

Figure 5:
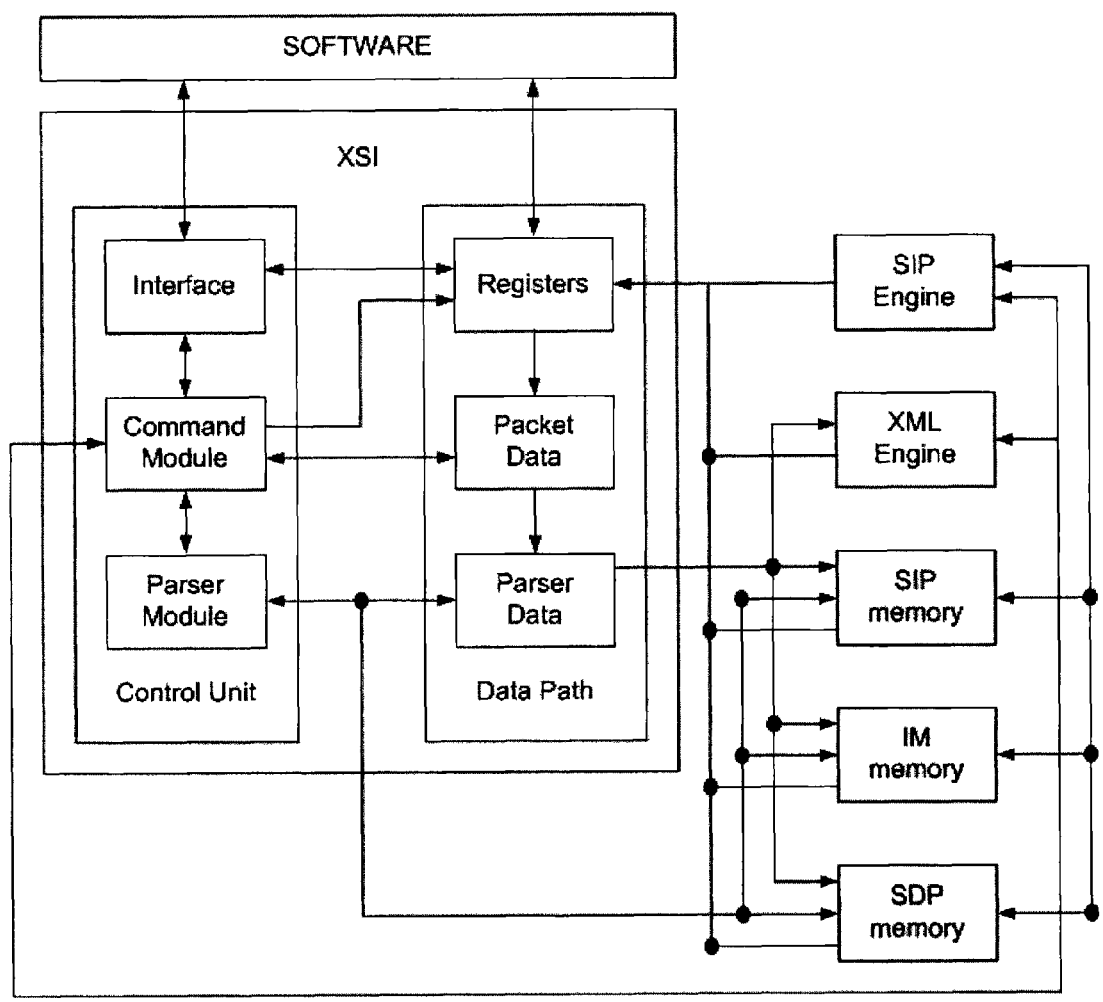
FIG. 5 is a block diagram depicting a high level architecture for the hardware interface (XSI) to the RMCS.

FIG. 5 describes the high level architecture of the XSI 33. It is divided into a control unit 51 and data path 52 responsible for high level logic and holding data respectively. The control unit 51 is a collection of finite state machines containing all the logic of the XSI 33. The interface 53 is used to interact directly with software by receiving and interpreting high level commands. Those commands are translated into lower level equivalents and sent to a command module 54. The command module 54 acts as the main coordination module of all the functionality that occurs in the RMCS. It is used to generate status values after every operation is complete and concurrently interact with all other modules to ensure that commands are properly executed. A parser module 55 is implemented as a separate component of the control unit and it is used for verifying data before it is send to the SIP and XML modules. Certain errors may be detected by the parser before data is sent to other modules, saving processing time.

The data path is divided into three major components. Data and status registers are stored in the Registers component 56 of the data path. When data is received from software it is directed to the Packet Data component 57 and subsequently to the Parser Data component 58, if necessary. Configuration data may also be sent directly to the XML engine 32 without being parsed but no such data is necessary for the SIP module.

Figure 6:
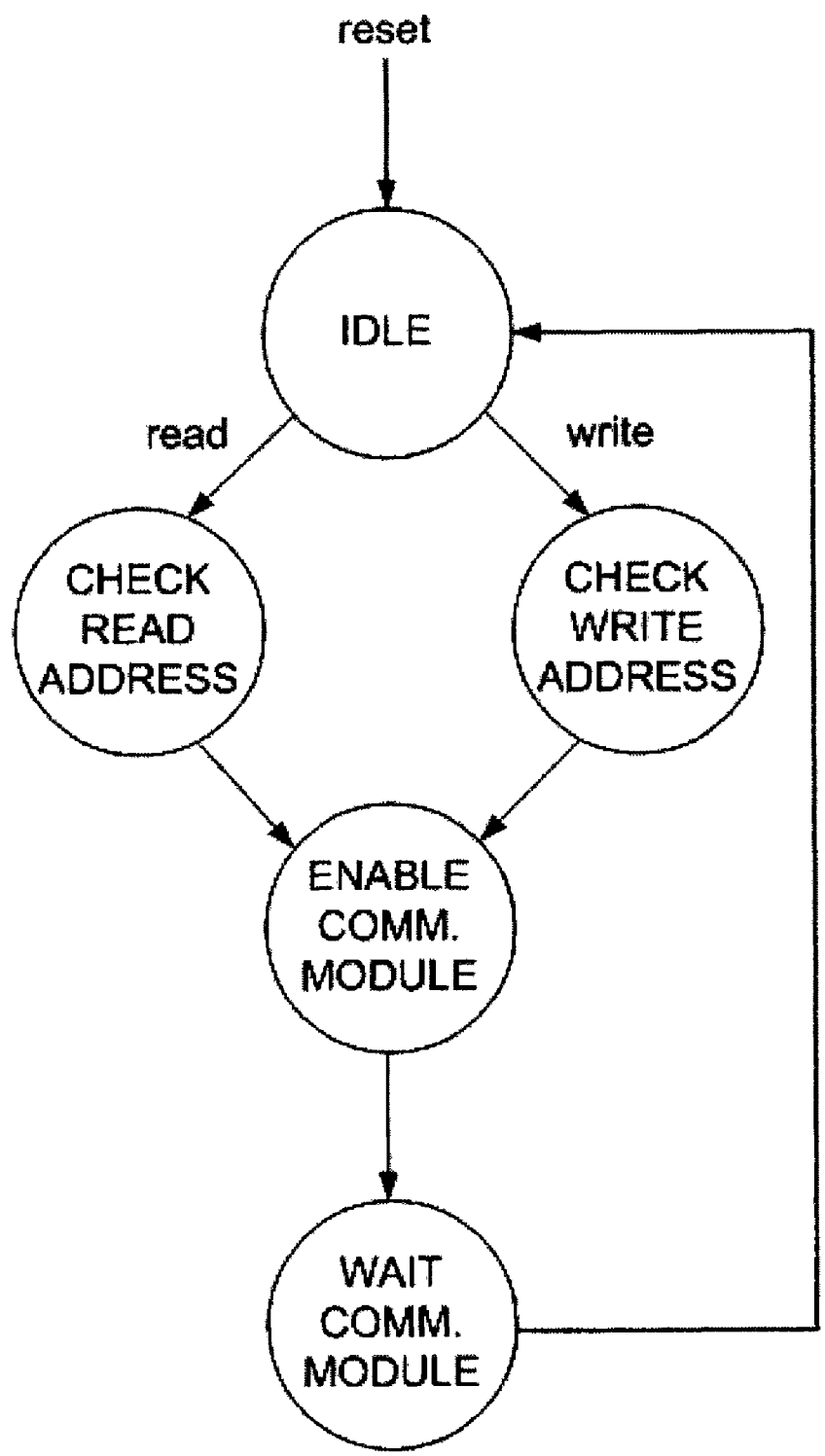
FIG. 6 is a diagram of a finite state machine describing a portion of functionality of the XSI.

A finite state machine describing the functionality of the XSI control unit interface 53 is described in FIG. 6. The interface 53 occupies an idle state when no commands are performed. When a read or write command is invoked to the RMCS, the address is saved and the interface 53 makes a transition to the state where the address is verified. If no errors are detected the command module is enabled to execute the appropriate sequence of actions. The interface 53 enters a wait state while the command module is operational and makes a transition to its idle state once all actions are complete.

Figure 7:
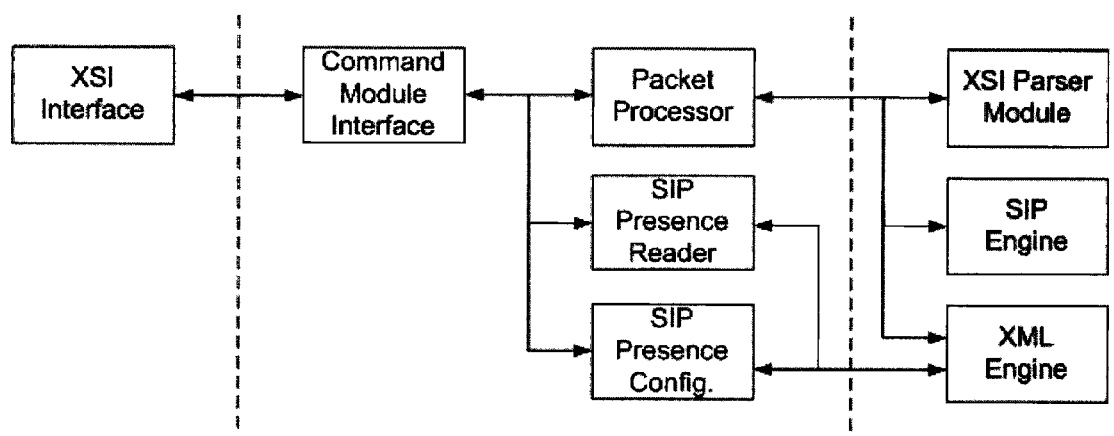
FIG. 7 is a block diagram depicting components of the XSI command module.

The command module 54 is divided into several modules as shown in FIG. 7. The packet processor 74 is used to manipulate the XSI parser module 55, SIP engine 31 and XML engine 32 so a SIP packet can be processed as efficiently as possible. The SIP presence reader 73 is used to read a PIDF document from the XML engine 32 while the SIP presence configuration module 74 is used to write configuration data into the XML engine 32.

Figure 8:
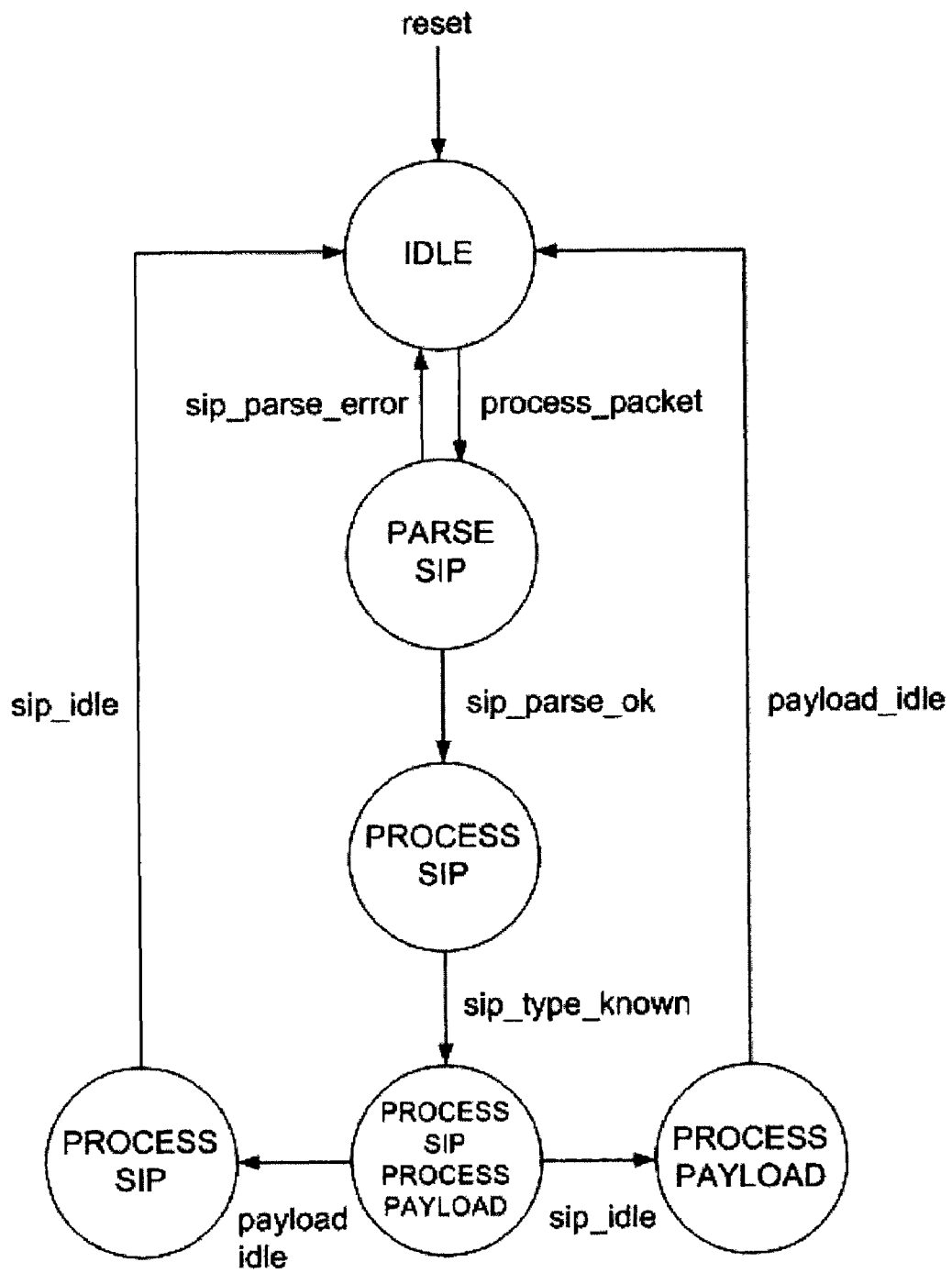
FIG. 8 is a diagram of a finite state machine describing the functionality of the XSI Command Module Packet Processor.

FIG. 8 describes the functionality of the packet processor 72 with a finite state machine diagram. The parser module 55 (described in the next section) is activated by the packet processor 72 to parse the SIP (or header) component of the packet. Once the parsing is complete feedback is sent to the packet processor 72 to indicate that the SIP component is syntactically correct or incorrect. The packet processor 72 immediately occupies an idle state when a syntactical error has occurred and proceeds to activate the SIP engine 31 for data processing in the absence of an error. When the SIP data type has been detected (INVITE, MESSAGE, NOTIFY, etc.) feedback is sent to the packet processor 72 allowing for the invocation of the appropriate module for payload data parsing while SIP data is being processed. In this manner the header and payload components of the header can be processed simultaneously. Once both the SIP and payload components have been successfully parsed and processed the packet processor 72 occupies its idle state.

The functionality performed by the payload processing state depends on the SIP data type detected. NOTIFY packets contain XML based PIDF data, MESSAGE packets contain instant messages and INVITE packets have SDP payloads. Separate functionality is invoked in each case to process the payload properly. Furthermore the detection of any payload with other SIP data types automatically generates an error and the deletion of the entire packet.

Figure 9:
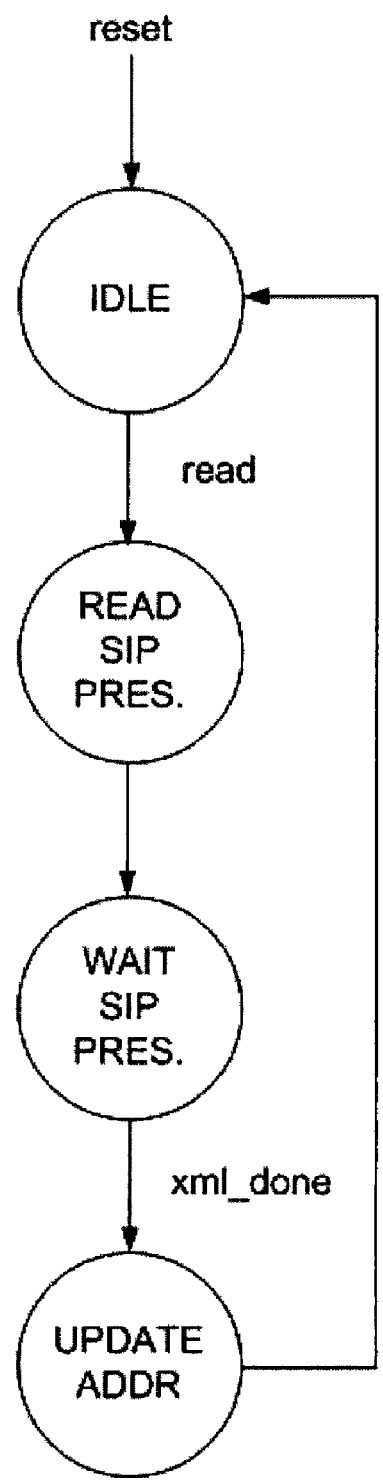
FIG. 9 is a diagram of a finite state machine describing the functionality of the XSI Command Module XML reader.

FIG. 9 describes the finite state machine for the SIP presence reader 73. SIP presence information is read sequentially and stored in memory so it can be transferred to software through the XSI 33. The memory address is incremented after every read operation. After all SIP presence information has been read the state machine transitions to its idle state.

Figure 10:
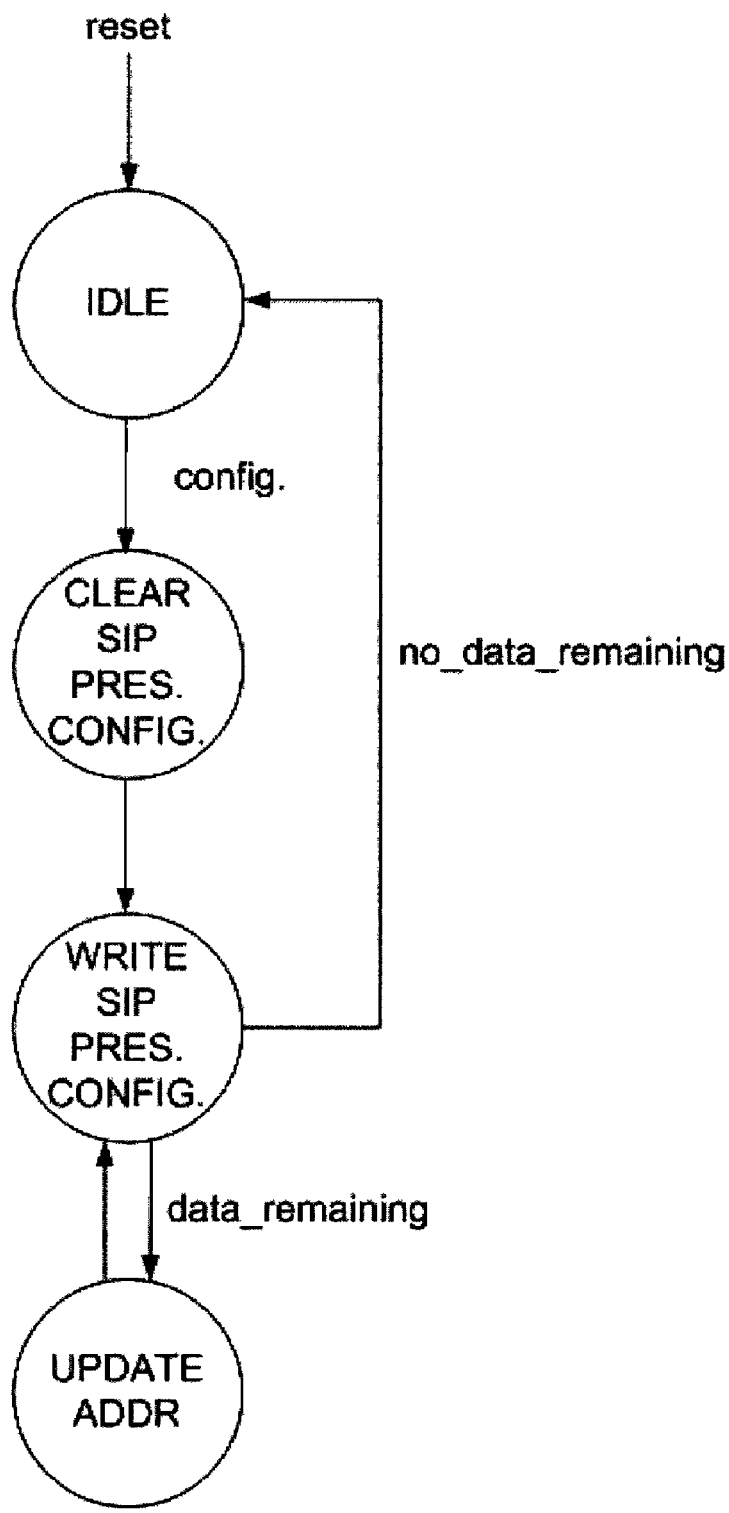
FIG. 10 is a diagram of a finite state machine describing the functionality of the XSI Command Module XML Configuration component.

FIG. 10 describes the state machine of the SIP presence configuration module 74. All previous data is first cleared, and then all configuration data is written sequentially into the XML engine. The memory address of the XML engine 32 is continuously incremented as data as long as data is available and the XML memory space has not been exceeded. Once all available data has been transferred to the XML engine 32 the state machine occupies its idle state.

Figure 11:
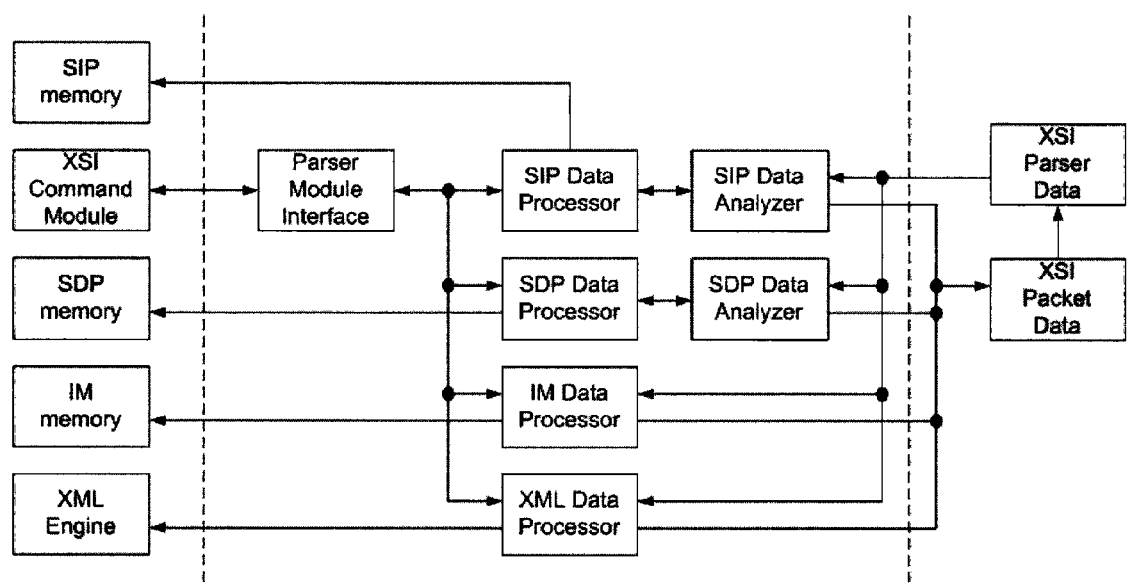
FIG. 11 is a block diagram depicting components of the XSI Parser module.

The XSI parser module 55 represents a subset of functionality required to preprocess all data before it is written to memory and processed by the SIP and XML engines. Due to its complexity it is implemented as a separate component and further divided into several modules as shown in FIG. 11. Two modules are used to process SIP data. A SIP data analyzer 113 processes a SIP packet on a character by character basis and determines the current state of the packet given its current values and previous values. The data processor 112 performs an arbitrary sequence of actions with the SIP data based on the state determined by the analyzer 113. These actions were separated so the RMCS may have its SIP implementation policy altered as easily as possible with minimal changes required in design and implementation. SDP information is parsed in an analogous manner with a data analyzer 115 and data processor 114. Data processors 116, 117 were also implemented for Instant Messages (IM) and XML data, however no analyzers were necessary because IMs are interpreted directly by the user and the XML engine 32 performs serialization and validation.

Figure 12:
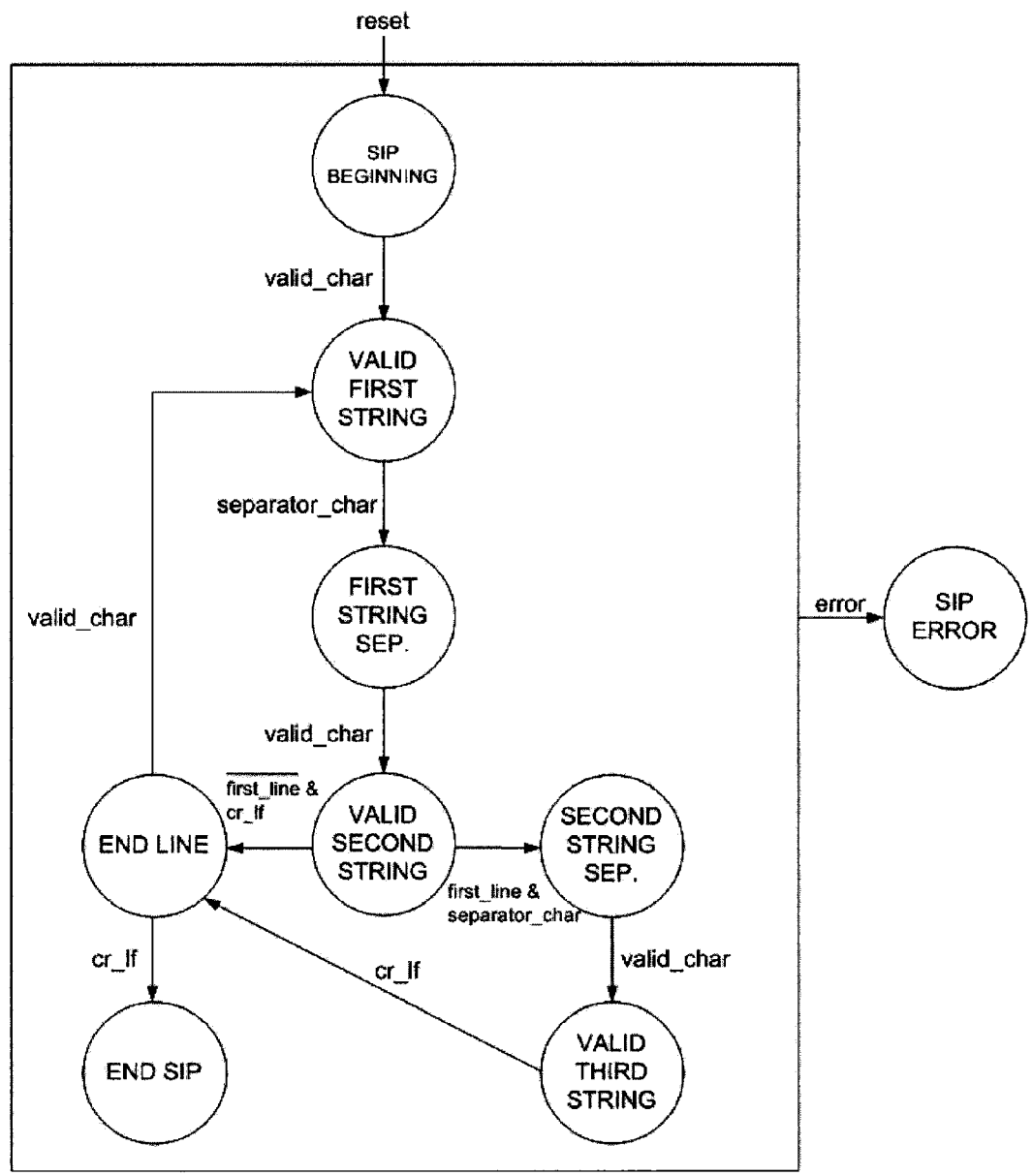
FIG. 12 is a diagram of a finite state machine describing the functionality of the XSI Parser module SIP data analyzer component.
Figure 13:
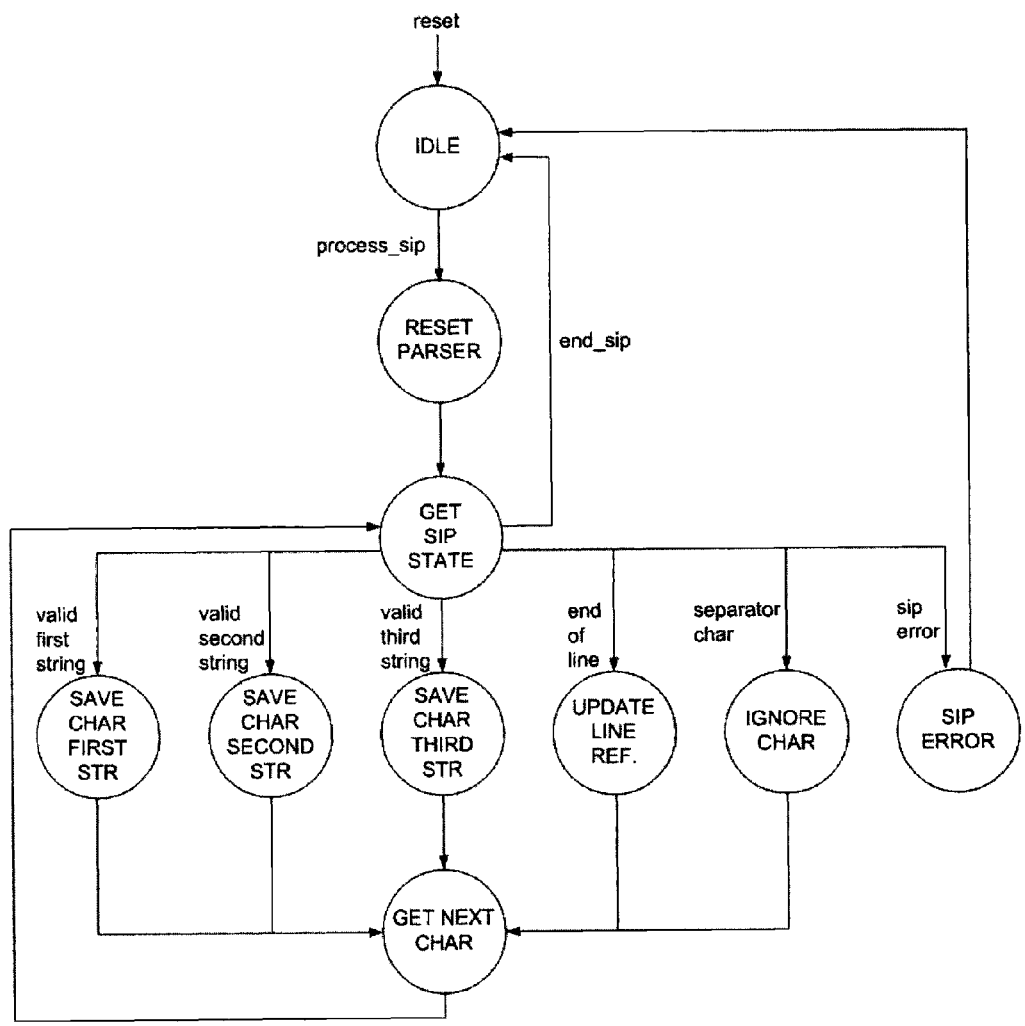
FIG. 13 is a diagram of a finite state machine describing the functionality of the XSI Parser module SIP data processor.

FIG. 12 illustrates the finite state machine for the SIP data analyzer 113. SIP data is processed character by character. From the second line onward, each line is separated into two strings separated by a colon followed by at least one space. The first line contains three strings separated only by spaces. As SIP data is analyzed character by character, the SIP data analyzer is used to determine which string or separator is currently being analyzed and to establish when the end of a line or all SIP data has been reached. The sequence of states described in FIG. 12 demonstrates the events causing transitions between various states. A syntactical error can occur at any time while SIP data is being analyzed. Therefore a global transition to an error state occurs when an unacceptable character sequence has been found. The exact sequence causing the error varies from state to state FIG. 13 demonstrates the finite state machine of the SIP data processor 112. It is used with the SIP data analyzer 113 to manipulate SIP data immediately after it has been analyzed. When the command to process SIP data is received the data analyzer 113 is reset and its state is transferred to the processor so the appropriate sequence of actions may take place. Valid characters for a first, second or third string are immediately saved in the appropriate locations, the end of a line causes the SIP line memory location to be updated at an external memory module and separator characters are ignored. The next character is then retrieved so the data analyzer can update its state and further processing can occur. When an error is detected all processing stops and the finite state machine occupies its idle state.

Figure 14:
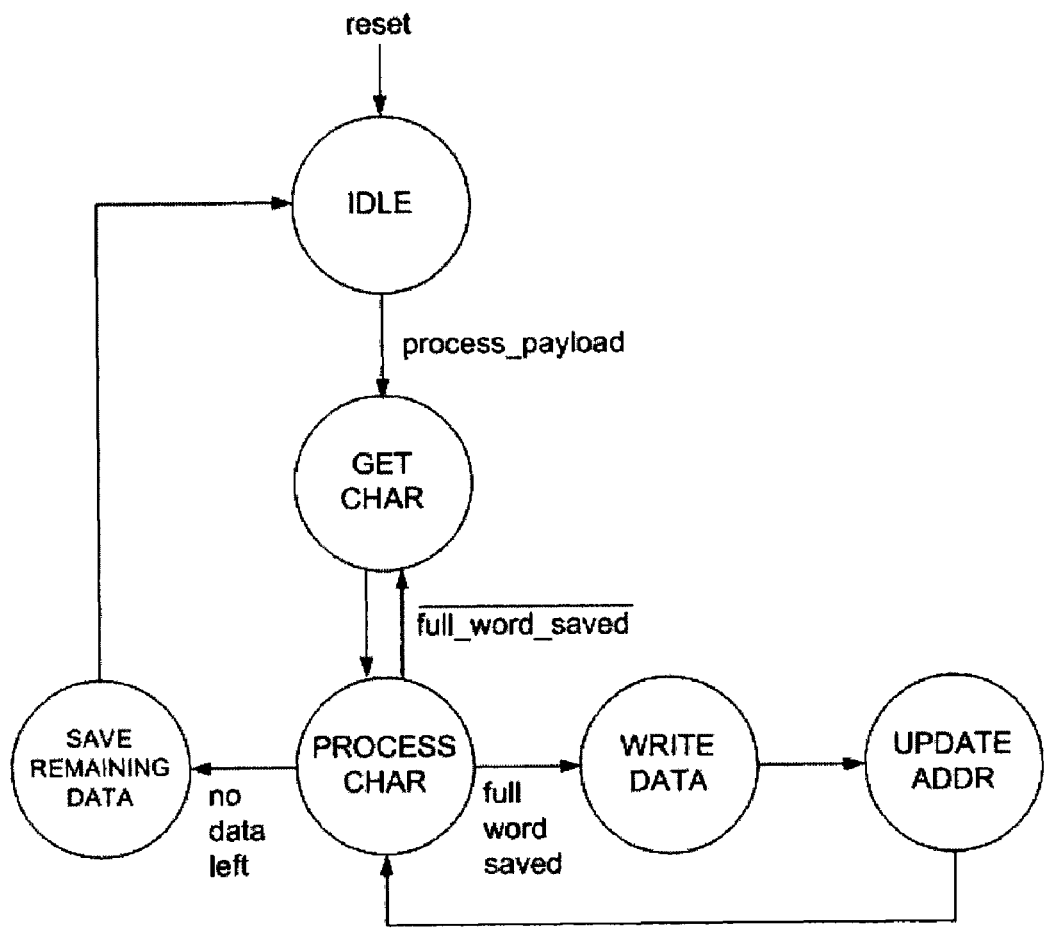
FIG. 14 is a diagram of a finite state machine describing the functionality of the XSI Parser module XML and IM Data Processors.

FIG. 14 demonstrates the finite state machine used to process both IM and XML payload data. Both types of data are manipulated directly by the SIP and XML modules, respectively. Therefore, the only functionality required is to collect and write the data into the appropriate memory locations. Although the functionality of the finite state machine is identical in both cases, the modules are implemented separately due to different memory locations and addressing mechanisms.

Data is read character by character until a full word of data (i.e. 32 bits from 4 characters) has been assembled. The word is written directly to the correct memory location and the address is updated. When no more data is available the unsaved data is written to memory and the state machine is idle.

This section describes the data path modules of the XSI illustrated in FIG. 5. The packet data module is a relatively simple FIFO (first in, first out) data structure used to write SIP and payload data into the RMCS in a sequential manner. Packet data is read sequentially before it is processed by the control unit.

Figure 15:
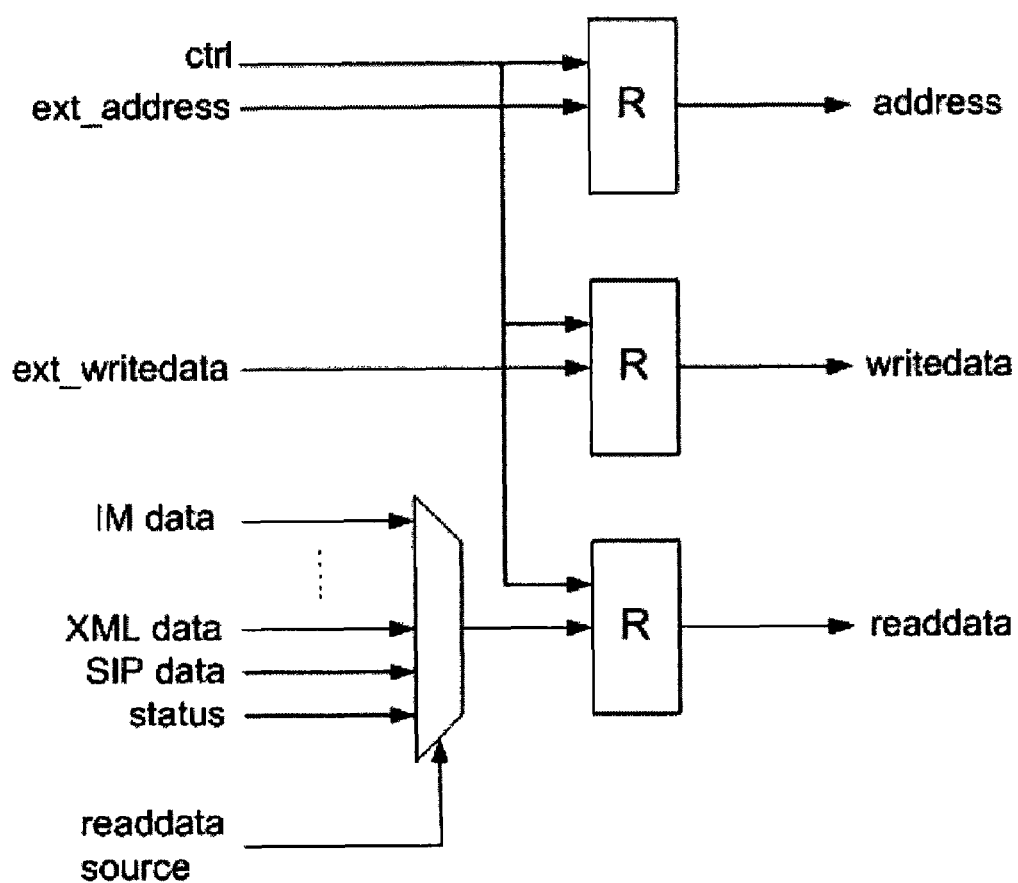
FIG. 15 is a diagram illustrating the XSI Registers data path.

FIG. 15 describes the XSI Registers data path module 56. Separate registers (Denoted R) are used to hold values for the address, writedata (data written into the RMCS from software) and readdata (data read from the RMCS to software) signals. Data inputs to the address and writedata registers are external signals connecting the RMCS to software. The input to the readdata register is multiplexed so all relevant data types can be transferred from the RMCS to software using the appropriate address. Those data types include SIP data, XML data, Instant Message and RMCS status updates. All registers have independent control signals so data can be written and reset as required.

Figure 16:
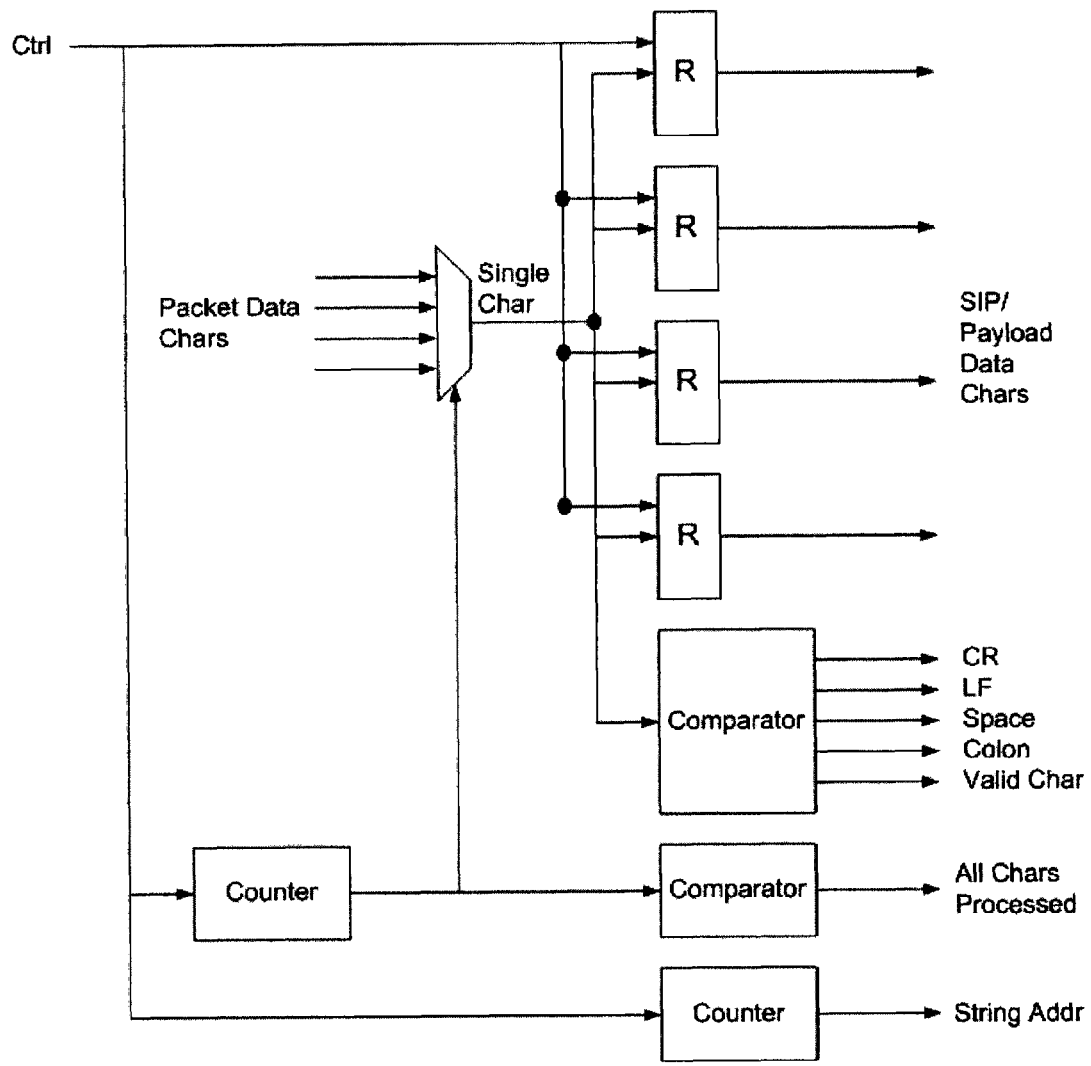
FIG. 16 is a diagram illustrating the XSI Parser data path.

FIG. 16 demonstrates the main components of the XSI parser data path 58. The output of the packet data module 57 is multiplexed so data can be separated into individual characters. Each character is sent to the input of four registers (Denoted R) for storage and a comparator to determine its value. A counter is used to iterate through characters so they may be processed in a sequential manner. A separate comparator indicates when all the characters for a single word have been processed so the register data may be saved to a separate location and the counter may be reset. The address for string data is updated through a counter so the correct location for SIP data is used at all times. Separate control signals are used to manipulate all the registers and counters. No control signals are required for the comparators. Other miscellaneous registers are also used for the XSI parser data path 58 but are not shown in FIG. 16 for the sake of simplicity. Data saved in other registers includes status values and memory addresses for the XML engine 32.

A high level description of the SIP engine 31 is provided in FIG. 31. Most of the SIP Engine's functionality is implemented in two modules: the packet generator 312 and packet parser 316. The SIP Packet Generator 312 is used to generate a SIP packet in its entirety. The header is written to the SIP memory component 34 while the payload is written to SDP or IM memory 35, 36 as required. When presence information is required it is produced by the XML engine 32 described later in this document. As the packet is generated information is saved to a Generated Data module 314 when necessary so a 200 OK packet can be correctly verified when it is received. The SIP Packet Parser 316 takes a preprocessed (i.e. syntactically correct) SIP packet from memory, analyzes its contents, writes data to the Received Data Module 317 and generates a response if necessary. A response to a SIP packet will be a 200 OK message (not requiring a payload) or an error depending on the packet contents.

FIG. 32 illustrates the SIP Data Module 315. The Data Module 315 is composed of databases for various types of information (users, field names, header types, etc), a string generator, an integer-to-ASCII converter and registers for configuration information.

FIG. 33 illustrates the finite state machine of the interface for the SIP Engine 31. Three high level functions are provided by the SIP Engine 31: generating a packet, parsing a packet and writing configuration data. Packet generation and configuration data manipulation require no other operations when they are complete. Parsing a packet requires the generation of a 200 OK packet as a response, unless an OK packet is being parsed.

FIG. 34 demonstrates the structure of the SIP Packet Generator 312. It contains an interface and one finite state machine to generate every line of a SIP packet. The outputs of the finite state machines are multiplexed so the correct output can be written to the SIP character generator in the right sequence. The SIP data module 315 provides a description of the packet contents so the right sequence of state machines is enabled.

The database components in FIG. 32 have two search functions. A database may be searched for a string given a unique identifier (index) and conversely it can be searched for the index corresponding to a given string. The data path of these databases is shown in FIG. 35. Strings are stored in the Data ROM. The string length and offset in data ROM are stored in the Length ROM and Offset ROM components of the data path. Various counters, registers and comparators are used to methodically search data as required. The status of the most recent search is saved in a register after an operation is complete.

The data base control unit is illustrated in FIG. 36. Basic states are used to write a search index, search string or reset the search string before a major search is performed. When an index-based search is performed, the necessary values from Length and Offset ROM are read and saved before Data ROM is accessed. Once the Data ROM component has been read the control unit occupies its idle state. This operation must be performed until the entire string has been read. When the last part of the string is read, an index-based search will not produce further data until the index has been reset.

When a string-base search is performed the necessary counters are reset before data from all ROM and RAM modules are read. The length and offset values are saved before a word of data is read from the Search String RAM component of the data path. Strings are compared one word at a time until a match has occurred after having searched the entire search string and database entry. If these conditions have not been met a new database entry or word of data is read to continue the search as required. The string-based search terminates when the index is out of bounds, indicating that the entire database has been searched with no success.

The SIP character (abbreviated as char in the figures) generator 313 interacts directly with the SIP memory component 34 to write a SIP packet as efficiently as possible. Multiple characters are written to SIP memory as often as possible depending on the amount of data available. SIP packets are generated one thirty-two bit word at a time and the following convention is used to describe the four characters: When referring to the location of new characters the first character contains the eight most significant bits while the second, third and last characters contain decreasingly significant bits. When describing the position of the last written character (denoted by the numbers zero, one, two and three) zero refers to the character with the least significant bits while numbers one, two and three describing characters with increasingly significant bits.

The database for the SIP character generator 313 is shown in FIG. 37. Inputs to all registers (denoted R) are multiplexed so that any combination of four characters can be written at any time. The correct combination of characters to be written is determined by the last character saved and the number of characters to be written (one, two, three or four). Data must be saved into the registers before it is written to SIP memory.

FIG. 38 demonstrates a high level description of the SIP character generator 313 control unit. Its functionality is divided into five finite state machines. One finite state machine acts as an interface while the others implement the functionality to write one, two, three or four characters of SIP data. The SIP character generator 381 interface is shown in FIG. 39. The interface merely activates the appropriate finite state machine to generate data and waits until it is complete before occupying its idle state.

Functionality to write four characters of SIP data is illustrated in FIG. 40. Data must be written to registers and SIP memory every time four characters are written. The sequence is determined by the last character of data. When writing three characters of SIP data only three scenarios involve writing directly to SIP memory. There is insufficient data in the data registers when writing from the first character as shown in FIG. 41. This trend continues when writing two and one characters of SIP data as illustrated in FIG. 42 and FIG. 43 respectively. SIP memory need not be accessed when writing small amounts of data from the first, second or third registers. The last character must be updated after every operation.

In the RMCS, the XML Engine 32 main task is to process the XML-based part of the transmitted/received SIP packet. A typical example of an XML-based SIP data is the SIP presence having a PIDF format. Note that PIDF stands for Presence Information Data Format and encodes presence information in XML according to IETF RFC-3863 specification. FIG. 25 shows an example of a PIDF SIP presence.

The block diagram of the XML Engine 32 is shown in FIG. 45. There are three main processors that make up the most essential parts of the XML Engine: (1) XML Parsing Processor 451, (2) XML Validator 453, and (3) XML Serializing Processor 454. Each of these processors is described below.

The architecture of the XML Parsing Processor 454 is highlighted in FIG. 46. While an XML-based document (e.g. SIP Presence of a PIDF format) is being received, a memory controller writes the data to one port of the dual-port XML memory 450. The other port of the memory is reserved to the XML Serializing Processor 454 to write XML-based data. Once the writing process ends, the XML Parsing Processor 451 is ready to start parsing upon the reception of a parsing command from the XSI. The memory controller reads 32 bits of XML data which are then passed to a collection of four FIFOs. Each FIFO handles 8 bits of data. A FIFO Control module identifies any XML tag that comes out of each of the four FIFOs outputs and sends its findings to two modules: the XML Parsing State Machine and the Validator. Accordingly, the XML Parsing State Machine makes its parsing state transition and sends back its decision to the FIFO Control module for synchronizing purposes. The Validator forwards the data to the Tokenizer module after it finishes its validation process. Based on the state of the XML Parsing State Machine and the data received from the Validator, the Tokenizer sends the parsed tokens to its Token writer module preparing the tokens to be written by the memory controller of the dual-port Token memory. The other port of the memory is reserved for the serialization process.

The block diagram of the XML Validator 453 is illustrated in FIG. 47. The main component of the validator is the Content-Addressable-Memory (CAM). Before the parsing process begins, the CAM is configured through XSI with selected XML characters depending on the application for which the parsing is to be performed. For example, in the case of SIP presence, the CAM is configured with XML characters that represent a "skeleton" of the XML-based PIDF presence format. The skeleton of a PIDF document includes XML tags and presence keywords such as "<pre", which is the first four characters of the starting XML root tag "<presence", and "</pr" which is the first four characters of the end tag "</presence>". The CAM includes matching logic to ensure that the received XML data conform to the skeleton configured in the CAM. If any string is matched, it will be given an ID which will be used in further processing tasks, instead of the original matched data, in order to boost the parsing performance. Similarly, a skeleton of an XML Schema can be used as well to configure the CAM in order to parse the corresponding XML Schema as a first stage, before parsing the XML document that must conform to this specific schema. The FIFO CAM IF, in FIG. 47, is an interface module that includes the logic to seize the data coming from the outputs of the FIFOs and to pass the data to the CAM for matching. The Validator classifies the data as "valid" if successfully matched, "unmatched" if there was no hit but may still be valid, or "ignored" if the data were invalid. The Validator control decision outputs are sent to the XML Parsing State Machine, and the classified data are sent to the Tokenizer for further processing. Moreover, the Validator logic keeps track partially of the well-formedness of the XML data. The responsibility of further checking the well-formedness of the XML data, especially for the data classified as "unmatched", is accomplished via the XML Parsing State Machine.

The XML Parsing State Machine is depicted in FIG. 48. Starting from its initial state, the state machine makes a transition to StartPI state upon the reception of the first valid XML data event. This is the beginning of the processing instruction of an XML document. The six subsequent states ensure the well-formedness of the whole processing instruction that includes the XML version and encoding attributes according to the requirements of the PIDF specifications. A transition to the StartDelimiter state occurs on the detection of "<" character, while the detection of ">" character leads to a transition to the EndDelimiter state. The detection of a string right after the "<" allows a transition to the StartTAG state, while the presence of "/" after "<" leads to the EndTAG state. If an additional string is detected while the current state is StartTAG, a transition is made to the GetToken state in order to get the name of the attribute. Subsequently, the state machine gets to the GetValue state in order to seize the value of the attribute. The outputs of the XML Parsing State Machine are then forwarded to the Tokenizer for further processing. During the time of each state, a signal is sent to the FIFO Control module for synchronization purposes.

The Tokenizer represents the last stage of the parsing process, and performs a three-fold role. First, it processes the classified data coming from the Validator. Second, it ensures that all tokens do not violate the PIDF specification for SIP presence. Finally, it sends the parsed data in an organized fashion to the memory controller of the dual-port Token memory for final writing execution. The Tokenizer tasks are done by means of a state machine as illustrated in FIG. 49. The first six states of the Tokenizer state machine, just coming after the initial state, make sure that the XML-based object being parsed conforms to the PIDF specifications. This is particularly referring to the "presence" keyword and the "entity" attribute that must be included. The value of this attribute represents the URL of the entity—called PRESENTITY—that is publishing its presence (FIG. 44—3$^{rd}$ line). The next state is "WAIT_TUPLE_ID" where the state machine waits until the parser's detection of a "tuple" which is a PIDF keyword. If no tuple is detected, the state machine steps to the "END_PRESENCE" state providing no notes are included. According to the PIDF specification, if a tuple exists, it must have an ID as well as a "status" element. Once the parser delivers the tuple ID value, the Tokenizer state machine makes transitions to two consecutive states to capture the ID data and send it to the token memory for writing. The next three states are used to capture the presence status "basic" element that can be typically either "open" or "closed".

When XSI sends its command to the XML engine to generate an XML-based SIP presence, the XML engine starts the serialization process. The aim of this process is to serialize SIP presence information into XML-based PIDF format. The Token Reader module, which represents the first stage of the serialization process, is illustrated in FIG. 50 as a state machine. The main task of the Token Reader is to pick up all the SIP presence information that has been updated. The update information was originally sent by XSI to the XML engine. When the XML engine received the update information, it stored it in its token memory. The states of the Token Reader indicate the status of the reading process, using the memory controller of the token memory. The read data are then sent to the serializer for processing.

The serializer main task is to organize the sparse SIP presence data into well-formed XML according to the PIDF format. The serialization state machine is illustrated in FIG. 51. The functionality of the serializer can be viewed as the reverse process of parsing. More specifically, XML start and end tags are added to the presence information received from the Token Reader. The transitions from a state to another are highly controlled by the status of the Token Reader. During the serialization process, the serialized data are written into the dual-port XML memory. Once the serialization process is finished, the XML engine reports the end of the process to the XSI. At its convenience, the XSI reads the XML serialized data and includes them in the corresponding SIP packet.

The RMCS is an embedded system for establishing sessions with multiple users through the Internet for multimedia VoIP or video communications. Sessions may be established with an arbitrary number of users and communication may take place using audio, video or text data. In addition to session management, basic text based communication is available through text messaging. Users may also exchange presence information with other session participants when there are changes in location or state. The RMCS can also be used to develop more sophisticated embedded applications for sophisticated multimedia communication requiring the aforementioned features.

The RMCS focuses on the areas of multimedia communications with audio, video and text-based data, and has potential to be embedded with the categories of products illustrated in FIGS. 27 and 28. These products include: consumer devices (i.e. Cell phones, PDAs, iPods, set-top boxes, PCs, etc.) or any device that is IP enabled and can connect to a communication network; edge and proxy servers (i.e., devices that are servers that can re-route or re-distribute traffic among other network devices); gateways (i.e., devices that are network systems can perform translation or mapping between two different networks; as well as application or service servers which are usually used to host services or application for the consumer devices.

In one exemplary implementation, the RMCS is integrated directly with the motherboard so that it can interact directly with a network via the NIC to receive and send SIP and XML content as shown in FIG. 29. This scenario allows for minimal software use and increases the consumer device performance. This configuration also allows the RMCS to interact with a sound module where a DSP can be used to handle voice calls. Significant performance improvements will be noticed on the small consumer devices like iPods, PDAs, cell phones and set-top boxes.

Highly scalable servers or gateways have multiple processors (CPUs) that are dedicated for certain functionality as shown in FIG. 30. In this scenario, the RMCS can be part of a separate application card or module dedicated to processing SIP and XML content. In this manner, server scalability is increased through the addition of more application cards. Furthermore, in the case of gateways, application cards allow more interoperability with dissimilar networks.

Below is a partial list of further benefits that the RMCS brings and addresses:
a) Augmenting performance in the area of consumer devices
b) Augmenting performance in the area of communication networking by implementing in hardware processes that are presently implemented in software packages, alleviating in this way the computational burden from the host device
c) Allowing peer to peer communication on any of the peer to peer architectures
d) Allowing scalability and predictability for engineering the servers and gateways.
e) Improving interoperability by allowing gateways to easily connect dissimilar networks.
f) Largely reducing the foot-space required for servers and gateways, and thus reducing power consumption on the network devices making the network "green".
g) Increasing the ROI as the price of purchasing gateways and servers is lower due to the usage of RMCS.
h) Increasing portability by allowing multiple RMCSs to be used if necessary.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A reconfigurable multimedia collaboration system, comprising:
a SIP engine implemented in hardware only that executes functions defined by Session Initiation Protocol (SIP);
a XML engine implemented in hardware only that executes functions defined by Extensible Markup Language (XML); and
an interface configured to receive an incoming data packet into a set of registers used to communicate with a software component and coordinates functions executed by the SIP engine and the XML engine,
wherein the interface invokes the SIP engine to parse an incoming data packet, the SIP engine operates to parse the incoming data packet to determine a packet type for the incoming data packet in accordance with SIP and sends a response to the interface, such that the response depends on the packet type determined for the incoming data packet, and wherein the interface invokes the XML engine in response to a determination that the incoming data packet is formatted in accordance with Presence Information Data Format.

2. The reconfigurable multimedia collaboration system of claim 1 further comprises a message processing service adapted to receive data packets formatted in accordance with SIP and generate commands for manipulating the set of registers in response thereto.

3. The reconfigurable multimedia collaboration system of claim 1 wherein the message processing service is implemented in software.

4. The reconfigurable multimedia collaboration system of claim 1 further comprises a memory accessible to the SIP engine, wherein the SIP engine writes data parsed from the incoming data packet to the memory.

5. The reconfigurable multimedia collaboration system of claim 1 wherein the interface invokes the XML engine for data packets that update presence information for a session participant.

6. The reconfigurable multimedia collaboration system of claim 1 wherein the interface implements an instant messaging extension in accordance with SIP.

7. The reconfigurable multimedia collaboration system of claim 6 further comprises a memory accessible to the interface, wherein the interface writes payload data from data packets containing instant messaging to the memory.

8. The reconfigurable multimedia collaboration system of claim 1 further comprises a memory accessible to the interface, wherein the interface writes payload data form data packets formatted in accordance with Session Description Protocol (SDP) to the memory.

9. The reconfigurable multimedia collaboration system of claim 1 is implemented in either a field programmable gate array or an application specific integrated circuit.

10. The reconfigurable multimedia collaboration system of claim 1 is implemented as a system on a chip.

11. The reconfigurable multimedia collaboration system of claim 1 is embedded in at least one of a consumer electronic device, a network server, or a network gateway.

12. A field programmable gate array, comprising:

a SIP component of the array configured to execute functions defined by Session Initiation Protocol (SIP);

an XML component of the array configured to execute functions defined by Extensible Markup Language (XML); and an interface component of the array configured to receive an incoming data packet into a set of registers used to communicate with a software component and to coordinate functions executed by the SIP component and the XML component, wherein the interface invokes the SIP engine to parse an incoming data packet, the SIP engine operates to parse the incoming data packet to determine a packet type for the incoming data packet in accordance with SIP and sends a response to the interface, such that the response depends on the packet type determined for the incoming data packet, and wherein the interface invokes the XML engine in response to a determination that the incoming data packet is formatted in accordance with Presence Information Data Format.

13. The field programmable gate array of claim 12 further comprises a memory accessible to the SIP component, wherein the SIP component writes data parsed from the incoming data packet to the memory.

14. The field programmable gate array of claim 12 wherein the interface component invokes the XML component for data packets that update presence information for a session participant.

15. The field programmable gate array of claim 12 wherein the interface component implements an instant messaging extension in accordance with SIP.

16. The field programmable gate array of claim 12 further comprises a memory accessible to the interface component, wherein the interface component writes payload data from data packets containing instant messaging to the memory.

17. The field programmable gate array of claim 12 further comprises a memory accessible to the interface component, wherein the interface component writes payload data form data packets formatted in accordance with Session Description Protocol (SDP) to the memory.

* * * * *